(12) United States Patent
Garcia-Clark et al.

(10) Patent No.: US 12,359,613 B2
(45) Date of Patent: Jul. 15, 2025

(54) INTEGRATED CARBON SEQUESTRATION AND POWER GENERATION SYSTEM AND METHODS OF USE

(71) Applicant: Arbor Energy and Resources Corporation, El Segundo, CA (US)

(72) Inventors: Andres Jose Garcia-Clark, San Pedro, CA (US); Bradley Hartwig, Manhattan Beach, CA (US); Aaron Ezekiel Smith, Hermosa Beach, CA (US)

(73) Assignee: Arbor Energy and Resources Corporation, El Segundo, CA (US)

( * ) Notice: Subject to any disclaimer, the term of this patent is extended or adjusted under 35 U.S.C. 154(b) by 0 days.

(21) Appl. No.: 18/412,241

(22) Filed: Jan. 12, 2024

(65) Prior Publication Data

US 2024/0240619 A1   Jul. 18, 2024

Related U.S. Application Data

(60) Provisional application No. 63/535,990, filed on Aug. 31, 2023, provisional application No. 63/479,875, filed on Jan. 13, 2023.

(51) Int. Cl.
*F02C 3/34*     (2006.01)
*B01D 53/14*    (2006.01)
(Continued)

(52) U.S. Cl.
CPC ............ *F02C 3/34* (2013.01); *B01D 53/1475* (2013.01); *C01B 32/50* (2017.08); *E21B 41/0064* (2013.01); *F01K 3/188* (2013.01); *F01K 23/067* (2013.01); *F02C 3/28* (2013.01); *F02C 3/30* (2013.01); *F03G 4/033* (2021.08);
(Continued)

(58) Field of Classification Search
None
See application file for complete search history.

(56) References Cited

U.S. PATENT DOCUMENTS 3,736,745 A   6/1973   Karig
4,498,289 A   2/1985   Osgerby
(Continued)

FOREIGN PATENT DOCUMENTS

WO   2010107914 A2   9/2010
WO   2013071069 A2   5/2013
(Continued)

OTHER PUBLICATIONS

Yao, X., et al., "Flexible Metal-Organic Frameworks as CO2 Adsorbents en Route to Energy-Efficient Carbon Capture," 2022.
(Continued)

*Primary Examiner* — Laert Dounis
(74) *Attorney, Agent, or Firm* — Bookoff McAndrews, PLLC

(57) ABSTRACT

Systems and methods for providing an integrated carbon sequestration and power generation system are disclosed. The integrated carbon sequestration and power generation system may include: a thermodynamic cycle configured to receive biomass and to output heat and power; and a direct air capture system configured to receive at least some of the heat and the power output from the thermodynamic cycle. Other aspects are described and claimed.

20 Claims, 12 Drawing Sheets

(51) Int. Cl.
  *C01B 32/50* (2017.01)
  *E21B 41/00* (2006.01)
  *F01K 3/18* (2006.01)
  *F01K 23/06* (2006.01)
  *F02C 3/28* (2006.01)
  *F02C 3/30* (2006.01)
  *F03G 4/00* (2006.01)
  *F25J 3/02* (2006.01)

(52) U.S. Cl.
  CPC ......... *F25J 3/0266* (2013.01); *C01B 2203/86* (2013.01); *Y02E 20/34* (2013.01); *Y02E 50/30* (2013.01)

(56) References Cited

U.S. PATENT DOCUMENTS

| | | |
|---|---|---|
| 6,684,643 B2 | 2/2004 | Frutschi |
| 7,900,450 B2 | 3/2011 | Gurin |
| 8,096,128 B2 | 1/2012 | Held et al. |
| 8,099,198 B2 | 1/2012 | Gurin |
| 8,281,593 B2 | 10/2012 | Held et al. |
| 8,596,075 B2 | 12/2013 | Allam et al. |
| 8,613,195 B2 | 12/2013 | Held et al. |
| 8,616,001 B2 | 12/2013 | Held et al. |
| 8,616,323 B1 | 12/2013 | Gurin |
| 8,633,011 B2 | 1/2014 | Palmer et al. |
| 8,776,532 B2 | 7/2014 | Allam et al. |
| 8,783,034 B2 | 7/2014 | Held |
| 8,794,002 B2 | 8/2014 | Held et al. |
| 8,813,497 B2 | 8/2014 | Hart et al. |
| 8,857,186 B2 | 10/2014 | Held |
| 8,869,531 B2 | 10/2014 | Held |
| 8,869,889 B2 | 10/2014 | Palmer et al. |
| 8,959,887 B2 | 2/2015 | Allam et al. |
| 8,986,002 B2 | 3/2015 | Palmer et al. |
| 9,014,791 B2 | 4/2015 | Held |
| 9,062,608 B2 | 6/2015 | Allam et al. |
| 9,062,898 B2 | 6/2015 | Held et al. |
| 9,068,743 B2 | 6/2015 | Palmer et al. |
| 9,091,278 B2 | 7/2015 | Vermeersch |
| 9,115,605 B2 | 8/2015 | Held et al. |
| 9,118,226 B2 | 8/2015 | Kacludis et al. |
| 9,284,855 B2 | 3/2016 | Held et al. |
| 9,316,404 B2 | 4/2016 | Gurin |
| 9,341,084 B2 | 5/2016 | Xie et al. |
| 9,410,449 B2 | 8/2016 | Held et al. |
| 9,410,481 B2 | 8/2016 | Palmer et al. |
| 9,416,728 B2 | 8/2016 | Palmer et al. |
| 9,441,504 B2 | 9/2016 | Held |
| 9,458,738 B2 | 10/2016 | Held et al. |
| 9,463,881 B2 | 10/2016 | Palmer |
| 9,523,312 B2 | 12/2016 | Allam et al. |
| 9,546,814 B2 | 1/2017 | Allam et al. |
| 9,562,473 B2 | 2/2017 | Itoh et al. |
| 9,581,082 B2 | 2/2017 | Allam et al. |
| 9,611,785 B2 | 4/2017 | Palmer et al. |
| 9,617,016 B2 | 4/2017 | Palmer et al. |
| 9,638,065 B2 | 5/2017 | Vermeersch et al. |
| 9,752,460 B2 | 9/2017 | Bowan |
| 9,847,834 B2 | 12/2017 | Palmer et al. |
| 9,850,815 B2 | 12/2017 | Allam et al. |
| 9,862,506 B2 | 1/2018 | Palmer |
| 9,863,282 B2 | 1/2018 | Hart et al. |
| 9,863,287 B2 | 1/2018 | Kacludis et al. |
| 9,869,245 B2 | 1/2018 | Allam et al. |
| 9,874,112 B2 | 1/2018 | Giegel |
| 9,919,268 B2 | 3/2018 | Allam et al. |
| 9,921,000 B2 | 3/2018 | Fetvedt |
| 9,926,811 B2 | 3/2018 | Giegel et al. |
| 9,932,861 B2 | 4/2018 | Preuss et al. |
| 10,018,115 B2 | 7/2018 | Allam et al. |
| 10,024,198 B2 | 7/2018 | Held et al. |
| 10,047,671 B2 | 8/2018 | Allam et al. |
| 10,047,673 B2 | 8/2018 | Allam et al. |
| 10,054,046 B2 | 8/2018 | Palmer et al. |
| 10,077,683 B2 | 9/2018 | Close |
| 10,103,737 B2 | 10/2018 | Fetvedt et al. |
| 10,187,153 B2 | 1/2019 | Adams et al. |
| 10,202,209 B2 | 2/2019 | Palmer |
| 10,260,416 B2 | 4/2019 | Allam et al. |
| 10,267,184 B2 | 4/2019 | Bowan et al. |
| 10,355,782 B2 | 7/2019 | Adams et al. |
| 10,415,434 B2 | 9/2019 | Allam et al. |
| 10,422,252 B2 | 9/2019 | Allam et al. |
| 10,472,994 B2 | 11/2019 | Avadhanula et al. |
| 10,495,098 B2 | 12/2019 | Preuss et al. |
| 10,533,461 B2 | 1/2020 | Fetvedt et al. |
| 10,562,648 B2 | 2/2020 | Palmer et al. |
| 10,570,777 B2 | 2/2020 | Bowan |
| 10,634,048 B2 | 4/2020 | Forrest et al. |
| 10,662,127 B2 | 5/2020 | Beauchamp et al. |
| 10,669,046 B2 | 6/2020 | Palmer et al. |
| 10,670,347 B2 | 6/2020 | Fetvedt |
| 10,711,695 B2 | 7/2020 | Allam et al. |
| 10,731,571 B2 | 8/2020 | Fetvedt |
| 10,746,461 B2 | 8/2020 | Allam |
| 10,794,274 B2 | 10/2020 | Itoh et al. |
| 10,859,264 B2 | 12/2020 | Fetvedt et al. |
| 10,883,388 B2 | 1/2021 | Held |
| 10,914,232 B2 | 2/2021 | Allam |
| 10,927,679 B2 | 2/2021 | Palmer et al. |
| 10,934,895 B2 | 3/2021 | Held et al. |
| 10,961,920 B2 | 3/2021 | Fetvedt et al. |
| 10,965,379 B2 | 3/2021 | Brown et al. |
| 10,975,766 B2 | 4/2021 | Allam et al. |
| 10,983,344 B2 | 4/2021 | Brown et al. |
| 10,989,113 B2 | 4/2021 | Forrest et al. |
| 11,066,298 B2 | 7/2021 | Rafati et al. |
| 11,097,221 B2 | 8/2021 | Lu et al. |
| 11,125,159 B2 | 9/2021 | Forrest |
| 11,174,208 B2 | 11/2021 | Beauchamp et al. |
| 11,174,759 B2 | 11/2021 | Allam et al. |
| 11,187,112 B2 | 11/2021 | Held |
| 11,199,327 B2 | 12/2021 | Lu et al. |
| 11,208,323 B2 | 12/2021 | Forrest et al. |
| 11,229,879 B2 | 1/2022 | Lu et al. |
| 11,231,224 B2 | 1/2022 | Allam et al. |
| 11,285,437 B2 | 3/2022 | Lu et al. |
| 11,293,309 B2 | 4/2022 | Bowan |
| 11,359,541 B2 | 6/2022 | Forrest et al. |
| 2002/0134085 A1* | 9/2002 | Frutschi .................. F02C 3/30 60/39.52 |
| 2005/0126156 A1 | 6/2005 | Anderson et al. |
| 2008/0289495 A1 | 11/2008 | Eisenberger et al. |
| 2010/0077792 A1 | 4/2010 | Gurin |
| 2010/0218930 A1 | 9/2010 | Proeschel |
| 2010/0300112 A1* | 12/2010 | Hannemann ............ F02C 3/28 60/39.461 |
| 2010/0314940 A1 | 12/2010 | Palmer et al. |
| 2011/0162380 A1 | 7/2011 | Thacker et al. |
| 2012/0067054 A1 | 3/2012 | Palmer et al. |
| 2012/0247455 A1 | 10/2012 | Gurin et al. |
| 2013/0118145 A1 | 5/2013 | Palmer et al. |
| 2014/0096442 A1 | 4/2014 | Palmer et al. |
| 2014/0102098 A1 | 4/2014 | Bowan et al. |
| 2015/0013977 A1 | 1/2015 | Palmer et al. |
| 2015/0020497 A1 | 1/2015 | Iwai et al. |
| 2015/0027099 A1 | 1/2015 | Iwai et al. |
| 2015/0198331 A1 | 7/2015 | Palmer et al. |
| 2015/0330261 A1 | 11/2015 | Held |
| 2016/0017758 A1 | 1/2016 | Vermeersch et al. |
| 2017/0362963 A1 | 12/2017 | Hostler et al. |
| 2018/0048390 A1 | 2/2018 | Palmer et al. |
| 2018/0128172 A1 | 5/2018 | Allam |
| 2018/0133647 A1 | 5/2018 | Lu et al. |
| 2018/0196139 A1 | 7/2018 | Brown et al. |
| 2018/0363550 A1 | 12/2018 | Allam et al. |
| 2019/0023414 A1 | 1/2019 | Palmer |
| 2019/0024583 A1 | 1/2019 | Lu et al. |
| 2019/0153937 A1 | 5/2019 | Palmer et al. |
| 2019/0203643 A1 | 7/2019 | Allam et al. |
| 2019/0260471 A1 | 8/2019 | Brown et al. |
| 2019/0338207 A1 | 11/2019 | Allam et al. |

(56) References Cited

U.S. PATENT DOCUMENTS

| | | |
|---|---|---|
| 2020/0040817 A1 | 2/2020 | Fetvedt et al. |
| 2020/0284189 A1 | 9/2020 | Iwai et al. |
| 2020/0284194 A1 | 9/2020 | Iwai et al. |
| 2020/0318544 A1 | 10/2020 | Allam et al. |
| 2020/0332727 A1 | 10/2020 | Fetvedt |
| 2020/0396524 A1 | 12/2020 | Adams et al. |
| 2020/0407222 A1 | 12/2020 | Brown, Jr. et al. |
| 2021/0115849 A1 | 4/2021 | Forrest et al. |
| 2021/0116126 A1 | 4/2021 | Fetvedt et al. |
| 2021/0155860 A1 | 5/2021 | Todd et al. |
| 2021/0189975 A1 | 6/2021 | Fetvedt et al. |
| 2021/0239043 A1 | 8/2021 | Allam |
| 2021/0277783 A1 | 9/2021 | Palmer et al. |
| 2021/0300765 A1* | 9/2021 | GilroySmith .......... B01D 53/62 |
| 2021/0323818 A1 | 10/2021 | Rafati et al. |
| 2021/0348806 A1 | 11/2021 | Held et al. |
| 2021/0388764 A1 | 12/2021 | Forrest |
| 2022/0045518 A1* | 2/2022 | Bernstein ................. F03D 9/11 |
| 2022/0056817 A1 | 2/2022 | Held |
| 2022/0074435 A1 | 3/2022 | Fetvedt et al. |
| 2022/0074594 A1 | 3/2022 | Lu et al. |
| 2022/0099003 A1 | 3/2022 | Lu et al. |
| 2022/0105463 A1 | 4/2022 | Lu et al. |
| 2022/0170388 A1* | 6/2022 | O'Donnell .............. C25B 1/042 |
| 2023/0287583 A1* | 9/2023 | Tsang ....................... C25B 9/65 |

FOREIGN PATENT DOCUMENTS

| | | |
|---|---|---|
| WO | 2014152778 A1 | 9/2014 |
| WO | 2015106110 A1 | 7/2015 |
| WO | 2016077440 A1 | 5/2016 |
| WO | 2016205116 A1 | 12/2016 |

OTHER PUBLICATIONS

International Search Report and Written Opinion for International Application No. PCT/US2024/011483, mailed on Feb. 5, 2024, 9 pages.

* cited by examiner

INTEGRATED CARBON SEQUESTRATION AND POWER GENERATION SYSTEM AND METHODS OF USE

CROSS REFERENCE TO RELATED APPLICATIONS

This application claims priority to U.S. Provisional Application No. 63/479,875, filed on Jan. 13, 2023, and U.S. Provisional Application No. 63/535,990, filed on Aug. 31, 2023, which are both incorporated by reference herein in their entireties.

TECHNICAL FIELD

Various embodiments of the present disclosure relate generally to an integrated carbon sequestration and power generation system and related methods of use, and, more particularly, to a biomass energy conversion cycle coupled with a direct air capture carbon system.

BACKGROUND

The anthropogenic emission of carbon dioxide ($CO_2$) gases from thermal processes (combustion) over centuries has caused the atmospheric composition of the planet earth to change. This has led to a planetary warming effect that is causing the earth's climate systems to change at an unprecedented rate. The biome adaptation mechanisms are in danger of collapsing due to the rapid change in atmospheric boundary conditions. The Intergovernmental Panel on Climate Change (IPCC) has decreed that in order to keep the average atmospheric temperature increase to 1.5° C., humans must remove 100-1000 gigatonnes of $CO_2$ in the $21^{st}$ century from the atmosphere.

The present disclosure is accordingly directed to addressing the foregoing issue(s). The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, an integrated carbon sequestration and power generation system is disclosed.

In accordance with an embodiment, an integrated carbon sequestration and power generation system is disclosed. The integrated carbon sequestration and power generation system includes a thermodynamic power cycle, such as a recuperated Brayton thermodynamic cycle, configured to receive biomass and to generate heat and power; and a direct air capture (DAC) carbon sequestration system configured to receive at least some of the heat and the power generated by the thermodynamic power cycle, such as a recuperated Brayton thermodynamic cycle, to facilitate carbon sequestration.

In accordance with another embodiment, a method of operating an integrated carbon sequestration and power generation system is disclosed. The method includes generating syngas via a gasification reaction involving a biomass, oxygen, and steam occurring in a gasifier; passing the generated syngas through a scrubber to produce a cleaned syngas; and cooling the cleaned syngas via introduction into a low temperature heat exchanger, wherein syngas heat is removed in the low temperature heat exchanger to produce steam. The method further includes introducing the cooled syngas, oxygen, and a recirculation carbon dioxide ($CO_2$) stream into a combustor; combusting the syngas to provide a combustion stream comprising $CO_2$ and water; expanding the combustion stream across a first turbine to generate a first turbine discharge stream and power; and expanding the first turbine discharge stream across a second turbine to generate a second turbine discharge stream and power, wherein the power is supplied to a generator. The method further includes cooling at least a portion of the second turbine discharge stream by passing the second turbine discharge stream through a recuperator heat exchanger; and passing the cooled second turbine discharge stream into a cooling bank, wherein the cooling bank comprises sorbent material containing captured $CO_2$, and wherein passage of the cooled second turbine discharge stream through the cooling bank heats the $CO_2$ sorbent material. The method also includes passing the recirculation $CO_2$ stream exiting the cooling bank through a compressor to produce a supercritical $CO_2$ stream; passing a first portion of the supercritical $CO_2$ stream to a storage location and passing a second portion of the supercritical $CO_2$ stream through a recirculation pump to produce the recirculation $CO_2$ stream; passing the recirculation $CO_2$ stream through the recuperator heat exchanger, wherein the recirculation $CO_2$ stream exchanges heat with the second turbine discharge stream at the recuperator heat exchanger; and passing the heated recirculation $CO_2$ stream into the combustor.

In accordance with another embodiment, an integrated carbon sequestration and power generation system is disclosed. The integrated carbon sequestration and power generation system includes a gasifier configured to receive a biomass and configured to produce a syngas; a combustor configured to produce a combustion stream from the cleaned syngas, oxygen, and a recirculation carbon dioxide ($CO_2$) stream; and at least one turbine, wherein the at least one turbine is operatively coupled to a direct air capture (DAC) carbon sequestration system and to a high pressure recirculation pump to optionally or simultaneously provide power produced by the at least one turbine to the DAC carbon sequestration system or to a power grid separate from the integrated carbon sequestration and power generation system.

In accordance with another embodiment, a method of operating an integrated carbon sequestration and power generation system is disclosed. The method includes operating, using one or more processors of a computer system, the integrated carbon sequestration and power generation system in a first operating mode, wherein power produced by a turbine generator of the integrated carbon sequestration and power generation system in the first operating mode is directed to power a direct air capture (DAC) carbon sequestration system; determining, using the one or more processors, that a predetermined condition is satisfied; switching, using the one or more processors and based on the determining, the operating mode of the integrated carbon sequestration and power generation system from the first operating mode to a second operating mode; and operating, subsequent to the switching, the integrated carbon sequestration and power generation system in the second operating mode, wherein the power produced by the turbine generator in the second operating mode is directed to a power grid of a power grid operator.

In accordance with another embodiment, a method of operating an integrated carbon sequestration and power generation system is disclosed. The method includes operating, using one or more processors of a computer system, the integrated carbon sequestration and power generation system in a first operating mode, wherein power produced by a turbine generator of the integrated carbon sequestration and power generation system in the first operating mode is directed to power a direct air capture (DAC) carbon sequestration system; determining, using the one or more processors, that a predetermined condition is satisfied; switching, using the one or more processors and based on the determining, the operating mode of the integrated carbon sequestration and power generation system from the first operating mode to a second operating mode; and operating, subsequent to the switching, the integrated carbon sequestration and power generation system in the second operating mode, wherein a first portion of the power produced by the turbine generator is directed to the DAC carbon sequestration system and a second portion of the power generated by the turbine generator is directed to a power grid of a power grid operator that is separate from the integrated carbon sequestration and power generation system.

In accordance with another embodiment, a method of supplying power produced by a turbine generator of an integrated carbon sequestration and power generation system to a power grid of a power grid operator is disclosed. The method includes determining, using one or more processors of a computing system, that a predetermined number or type of assets are unavailable to the power grid operator during a first time interval and are available to the power grid operator during a second time interval; causing, using the one or more processors, the power generated by the turbine generator to be transferred to the power grid of the power grid operator during the first time interval; and causing, using the one or more processors, the power generated by the turbine generator to be transferred to a direct air capture (DAC) carbon sequestration system of the integrated carbon sequestration and power generation system during the second time interval.

In accordance with another embodiment, a method of operating an integrated carbon sequestration and power generation system is disclosed. The method includes determining a first projected value derived from sequestration of carbon dioxide when operating the integrated carbon sequestration and power generation system in a first operating mode; determining a second projected value derived from provision of power to a third-party system when operating the integrated carbon sequestration and power generation system in a second operating mode; operating the integrated carbon sequestration and power generation system in the second operating mode responsive to determining that the second projected value is greater than the first projected value; and operating the integrated carbon sequestration and power generation system in the first operating mode responsive to determining that the second projected value is less than the first projected value.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate the disclosed embodiments, and together with the description, serve to explain the principles of the disclosed embodiments. There are many aspects and embodiments described herein. Those of ordinary skill in the art will readily recognize that the features of a particular aspect or embodiment may be used in conjunction with the features of any or all of the other aspects or embodiments described in this disclosure. In the drawings.

DETAILED DESCRIPTION OF THE EMBODIMENTS

Figure 1:
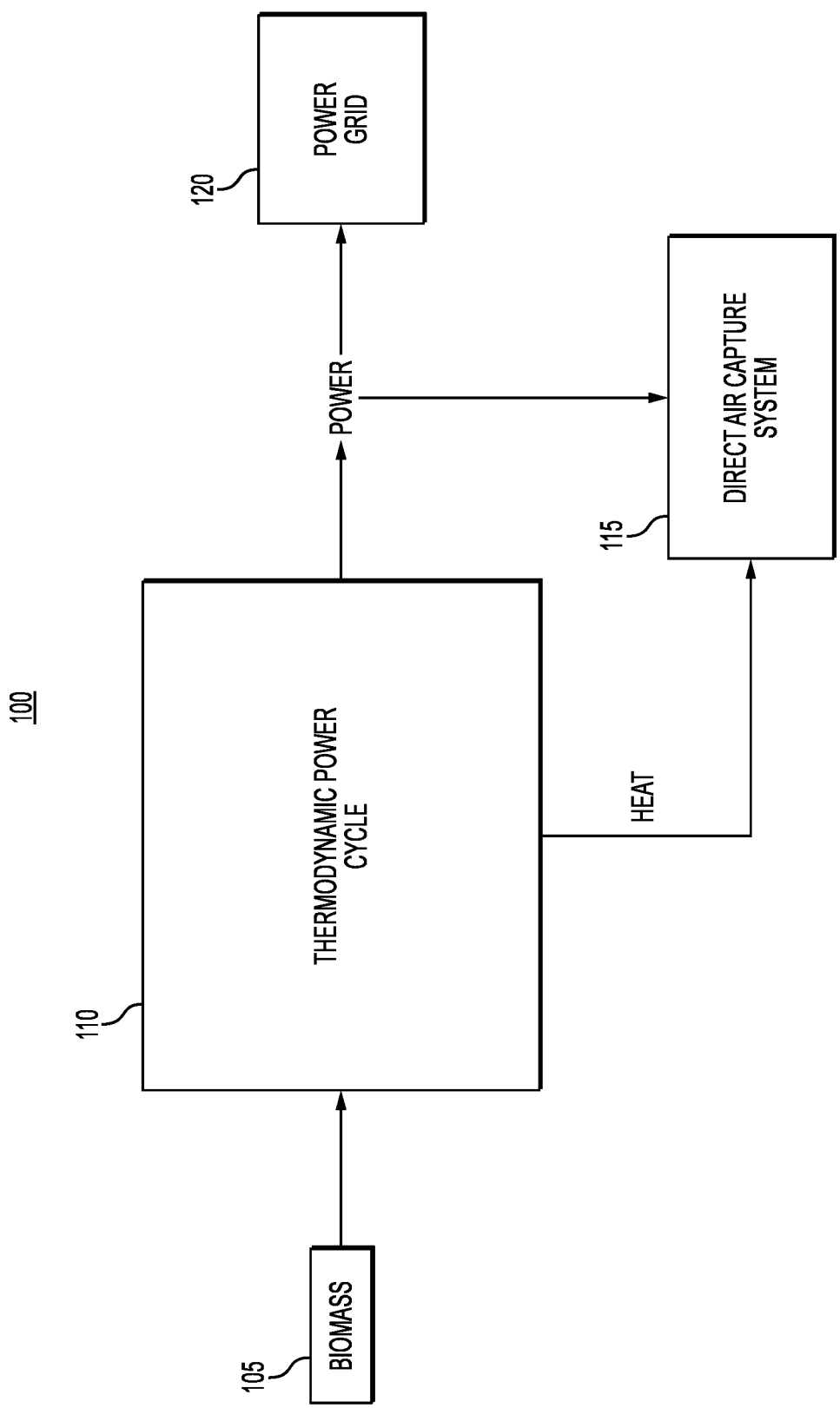
FIG. 1 depicts a schematic illustration of an exemplary integrated carbon sequestration and power generation system, according to various aspects of the present disclosure.

Both the foregoing general description and the following detailed description are exemplary and explanatory only and are not restrictive of the features, as claimed. In this disclosure, the term "based on" means "based at least in part on." The singular forms "a," "an," and "the" include plural referents unless the context dictates otherwise. As used herein, the terms "comprises," "comprising," or other variations thereof, are intended to cover a non-exclusive inclusion such that a process, method, article, or apparatus that comprises a list of elements does not include only those elements, but may include other elements not expressly listed or inherent to such a process, method, article, or apparatus. Additionally, the term "exemplary" is used herein in the sense of "example," rather than "ideal." An embodiment or implementation described herein as "exemplary" is not to be construed as preferred or advantageous, for example, over other embodiments or implementations; rather, it is intended to reflect or indicate that the embodiment(s) is/are "example" embodiment(s).

It should be noted that all numeric values disclosed or claimed herein (including all disclosed values, limits, and ranges) may have a variation of +/−10% (unless a different variation is specified) from the disclosed numeric value. Moreover, in the claims, values, limits, and/or ranges mean the value, limit, and/or range+/−10%. In addition, relative terms, such as "approximately" and "about" are generally used to indicate a possible variation of ±10% of a stated or understood value unless indicated otherwise in the specification. In addition, the term "between" used in describing ranges of values is intended to include the minimum and maximum values described herein. The use of the term "or" in the claims and specification is used to mean "and/or" unless explicitly indicated to refer to alternatives only, or the alternatives are mutually exclusive, although the disclosure supports a definition that refers to only alternatives and "and/or." As used herein "another" may mean at least a second or more.

As used herein, certain terms, e.g., "working fuel," "$CO_2$ stream," "syngas," and other like terms may be used interchangeably throughout the description of the embodiments.

Additional objects and advantages of the embodiments will be set forth in part in the description that follows, and in part will be obvious from the description, or may be learned by practice of the embodiments. It is to be understood that both the foregoing general description and the following detailed description are exemplary and explanatory only and are not restrictive of the claims.

To achieve carbon sequestration, there are alternatives available, including: reforestation, direct air carbon capture and sequestration, Biomass with Carbon Removal and Storage (BiCRS), and other technologies that may be unproven (e.g., algae production and sinking, etc.). Afforestation/reforestation is low cost, difficult to model, and has a low time horizon for trapping the $CO_2$ (e.g., potentially as soon as 50-100 years). Direct air carbon capture and sequestration is higher cost (e.g., as driven by energy demands), easy to model and quantify, and has a high time horizon for captured carbon (e.g., 1000+ years depending on capture medium). BiCRS is medium cost (e.g., as driven by equipment capital investment), easy to model and quantify, and has a high time horizon for captured carbon (e.g., 1000+ years depending on capture medium).

Most of the approaches described above require extensive energy use, which in our current society, typically comes from carbon emitting sources, thereby effectively reducing the amount of carbon sequestered. Additionally, the carbon drawdown effects of afforestation/reforestation are difficult to measure and verify, while the permanence is also highly uncertain. Although these afforestation/reforestation and other land and ocean capture methods may play a role in carbon-reduction efforts, they are unlikely to reach the scale and permanence required to avoid a climate crisis. Additionally, current BiCRS, also known as Bio Energy with Carbon Capture and Sequestration (BECCS) systems, are not generally designed with scalability in mind and are the product of trying to retrofit existing biomass power plants with carbon sequestration systems, which may be prohibitively expensive and may not allow these power generation plants to compete in power grid markets.

In view of the foregoing, a solution is proposed for a system design that is made with BiCRS from the start, using oxyfuel combustion to generate a concentrated stream of $CO_2$ that is used to power the system. Pairing this system with a bottoming temperature and pressure swing adsorption cycle that utilizes the waste heat to regenerate sorbents, a hybrid BiCRS+direct air carbon (DAC) sequestration system may be produced that has a larger carbon drawdown potential as compared to other engineered systems on an energy basis. More particularly, in some aspects, a carbon neutral or carbon negative fuel, such as waste biomass, may be converted into ready-to-sequester $CO_2$, heat, and power, e.g., using a thermodynamic power cycle. Exemplary thermodynamic power cycles may include, e.g., a Brayton cycle, a recuperated Brayton thermodynamic cycle, a Rankine cycle, a steam turbine cycle with Rankine, etc. Such thermodynamic cycles may use $CO_2$ and/or super critical $CO_2$ ($sCO_2$) as the main working fluid. At least some of the heat and power generated from the thermodynamic cycle may then be used to drive an integrated direct air carbon capture system, or the power may be used for one or more other purposes (e.g., the power may be electrical power that is utilized for grid integration, or the power may be output in the form of mechanical power). Such an exemplary system 100 is shown schematically in FIG. 1. It should be understood that FIG. 1 generally describes an overall integrated carbon sequestration and power generation system, of which systems 200, 500, 600, and 700 (discussed further herein) are exemplary embodiments.

As shown in FIG. 1, biomass 105 may be introduced into a thermodynamic power cycle 110 in which waste heat is used to power the DAC sequestration system and regenerate sorbent. In the context of this application, biomass 105 refers to any carbon neutral or carbon negative fuel. For instance, potential types of biomass 105 may include, e.g., wood products, such as wood processing wastes (e.g., firewood, wood pellets, wood chips, lumber and sawdust waste, etc.), agricultural products, including crops and waste materials (e.g., corn, soybeans, sugar cane, woody plants, algae, etc.), biogenic materials in municipal solid waste (e.g., paper, cotton, wool products, food, yard waste, etc.), non-biogenic materials in municipal solid waste (e.g., plastics or petroleum-based products), animal manure, or human sewage (e.g., bio waste discharge from water treatment plants). The biomass 105 may be broken down within the thermodynamic power cycle 110 to produce $CO_2$. In an aspect, non-limiting types of possible thermodynamic power cycles that may be utilized include Brayton thermodynamic power cycles, recuperated Brayton thermodynamic power cycles, Rankine thermodynamic power cycles, etc. Specific examples of thermodynamic cycles and processes for breaking down biomass 105 are discussed in further detail below. It is important to note that although the examples described throughout the specification may refer to a recuperated Brayton thermodynamic power cycle, this designation is not limiting, and other thermodynamic power cycles may be utilized in lieu or, or in addition to, the recuperated Brayton thermodynamic power cycle.

In an aspect, the $CO_2$ may be heated by combustion heat derived from a reaction of bio-syngas and oxygen in the thermodynamic power cycle 110 (e.g., a recuperated Brayton thermodynamic cycle) to form a $CO_2$ working fluid. The $CO_2$ working fluid may be a supercritical $CO_2$ working fluid, subcritical $CO_2$ working fluid, steam, or a combination thereof. The working fluid may be utilized to generate power and heat. In one configuration, the generated power may be provided to a direct air capture (DAC) system 115, which may be configured to capture $CO_2$ directly from the atmosphere. More particularly, the DAC system 115 may contain sorbent materials, e.g., solid sorbent materials (e.g., Metal Organic Frameworks (MOFs), zeolites, silica, activated carbon, etc.), and/or liquid sorbent materials containing aqueous inorganic bases or aqueous organic amines, etc., that are capable of effectively adsorbing or absorbing and storing atmospheric $CO_2$, and which have a low temperature or high energy requirement for $CO_2$ regeneration. The rejected heat from the thermodynamic power cycle 110 (e.g., a recuperated Brayton thermodynamic power cycle) may be used to extract the captured atmospheric $CO_2$ and to regenerate the sorbent materials and the generated power may be used to compress the extracted $CO_2$ captured from the DAC system 115. Once extracted, the captured $CO_2$ may be permanently stored underground, reintroduced into the thermodynamic power cycle 110, and/or may be sold. In another operational configuration, the generated power produced by the thermodynamic power cycle 110 (e.g., a recuperated Brayton thermodynamic power cycle) may optionally be integrated to a power grid 120. In yet another operational configuration, a portion of the generated power may be integrated to the power grid 120, and another portion may be used to power the DAC system 115, allowing for the simultaneous supply of power to both power grid 120 and DAC system 115.

Accordingly, exemplary embodiments of the present disclosure provide for a power generation system that uses biomass as a fuel and uses $CO_2$ as the working fluid. For example, a gasifier may be used to convert carbonaceous biomass into a useable fuel source for power generation. Such a system may utilize the $CO_2$ working fluid to pressurize a biomass solids conveyance system, cool syngas reactor walls, or quench the syngas flow coming out of the gasifier reactor, as will be described further below.

This power generation system may further be integrated with a carbon sequestration system that is capable of directly capturing carbon from the air. Embodiments of the present disclosure provide for the integration of a $CO_2$ power cycle with a Direct Air Capture (DAC) system, which may use $CO_2$ and/or $sCO_2$ thermodynamic power cycle waste heat as a sorbent regenerator for the $CO_2$ sequestration cycle, as described in reference to FIG. 1. Additionally, power generation systems of the present disclosure may be used as "peaker plants," or power plants that generate power for the power grid only when there is a higher demand for electricity, as will be described further below. In such an implementation, the energy generated by the disclosed systems may be used for multiple functions, e.g., for generating power for dispatch to the power grid, and for powering carbon sequestration via an integrated DAC system.

In some aspect, other embodiments of the present disclosure provide for selection of a high pressure cycle pump inlet to enable inlet flow robustness and independence from ambient conditions on the inlet of the pump system. Compressors may be sensitive to inlet conditions and may be forced to derate (i.e., reduce power) or turn off all together if conditions are not favorable. More particularly, the density of the $CO_2$ may be sensitive to the temperature of the $CO_2$ fluid at the bottom the pressure ladder. The temperature at the bottom of the pressure ladder may be affected by ambient temperature or may be close to the ambient temperature due to heat rejection methods. This density of the $CO_2$ may affect the operation of the turbomachinery of the cycle. The temperature density sensitivity may be acute near the critical pressure of $CO_2$ at 73.8 bar. In an aspect, by increasing the inlet pressure of the recirculation pump (which may be the lowest pressure in the recirculation loop), the first derivative of density and pressure at a given temperature may be decreased, thereby causing the $CO_2$ density to be less dependent on its temperature, e.g., ambient conditions. This in turn may allow the system to operate in varied geographic locations, which may have hot, cold, or moderate ambient temperature conditions, without the need for bodies of water to conduct cooling. In some aspects, by operating above the critical pressure of $CO_2$ (e.g., at above about 100 bar, from about 100 bar to about 150 bar, from about 120 bar to about 130 bar, or about 125 bar), normal temperature swings in ambient condition (e.g., changes in temperature from day to night or from summer to winter) may only change the $CO_2$ density by about 20% or less, by about 15% or less, by about 10% or less, or by about 5% or less. Conversely to the foregoing, in another aspect, the system may be transcritical at a lowest pressure of, e.g., approximately 35 bar, so the inlet pressure of the recirculation pump may not need to be increased, as described above. Accordingly, aspects of the disclosure may be drawn to a more robust system that may be able to run under a wider range of ambient conditions compared to a system designed to operate near the critical pressure of $CO_2$ will be able to.

The subject matter of the present disclosure will now be described more fully hereinafter with reference to the accompanying drawings, which form a part hereof, and which show, by way of illustration, specific exemplary embodiments. System 100 may take the form of any of the alternative embodiments described herein, e.g., in regards to FIGS. 2, 5, 6, and 7. Subject matter may be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof. The following detailed description is, therefore, not intended to be taken in a limiting sense.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment, and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

Figure 2:
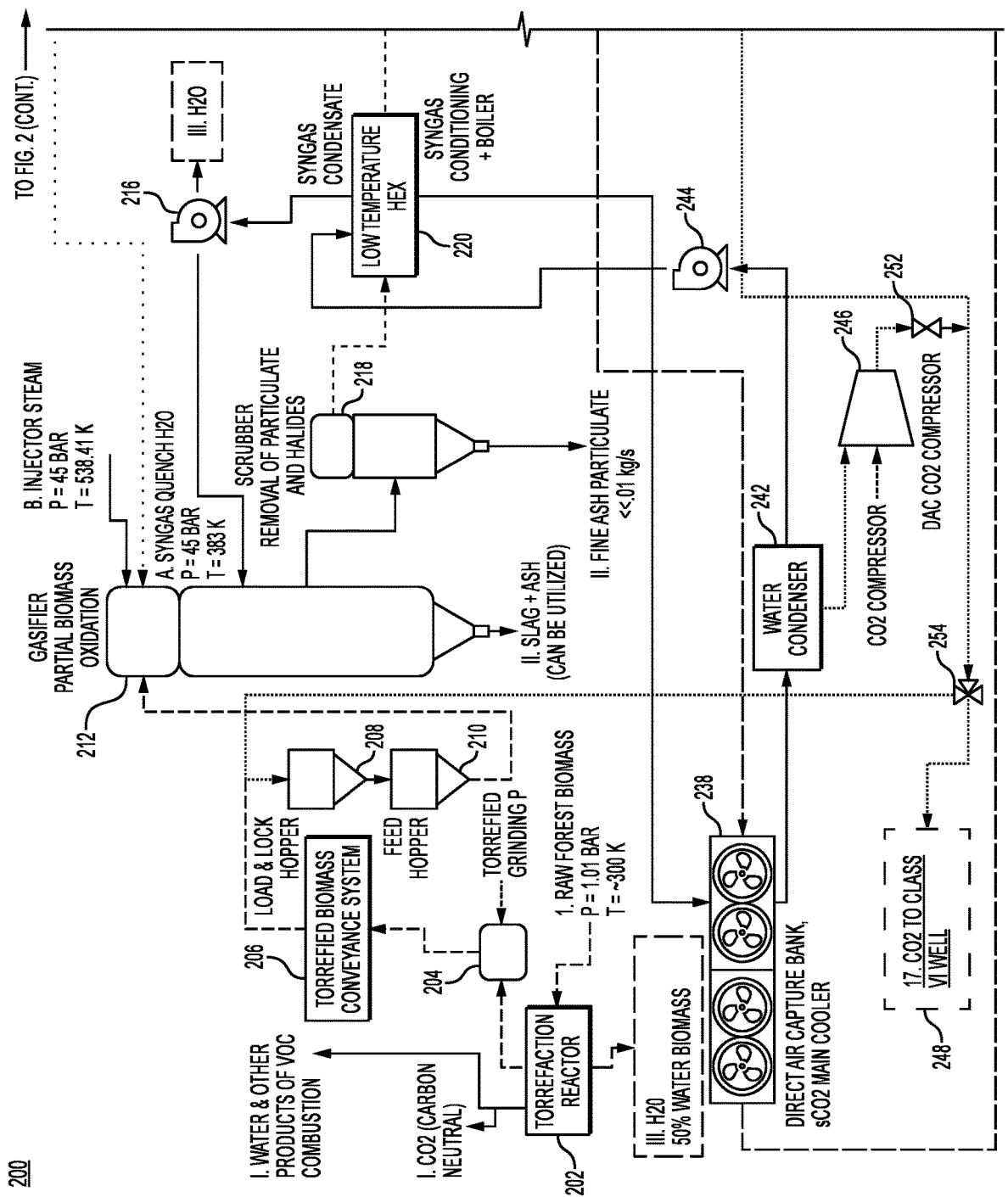
FIG. 2 depicts a schematic illustration of an exemplary integrated carbon sequestration and power generation system, according to various aspects of the present disclosure.
Figure 2:
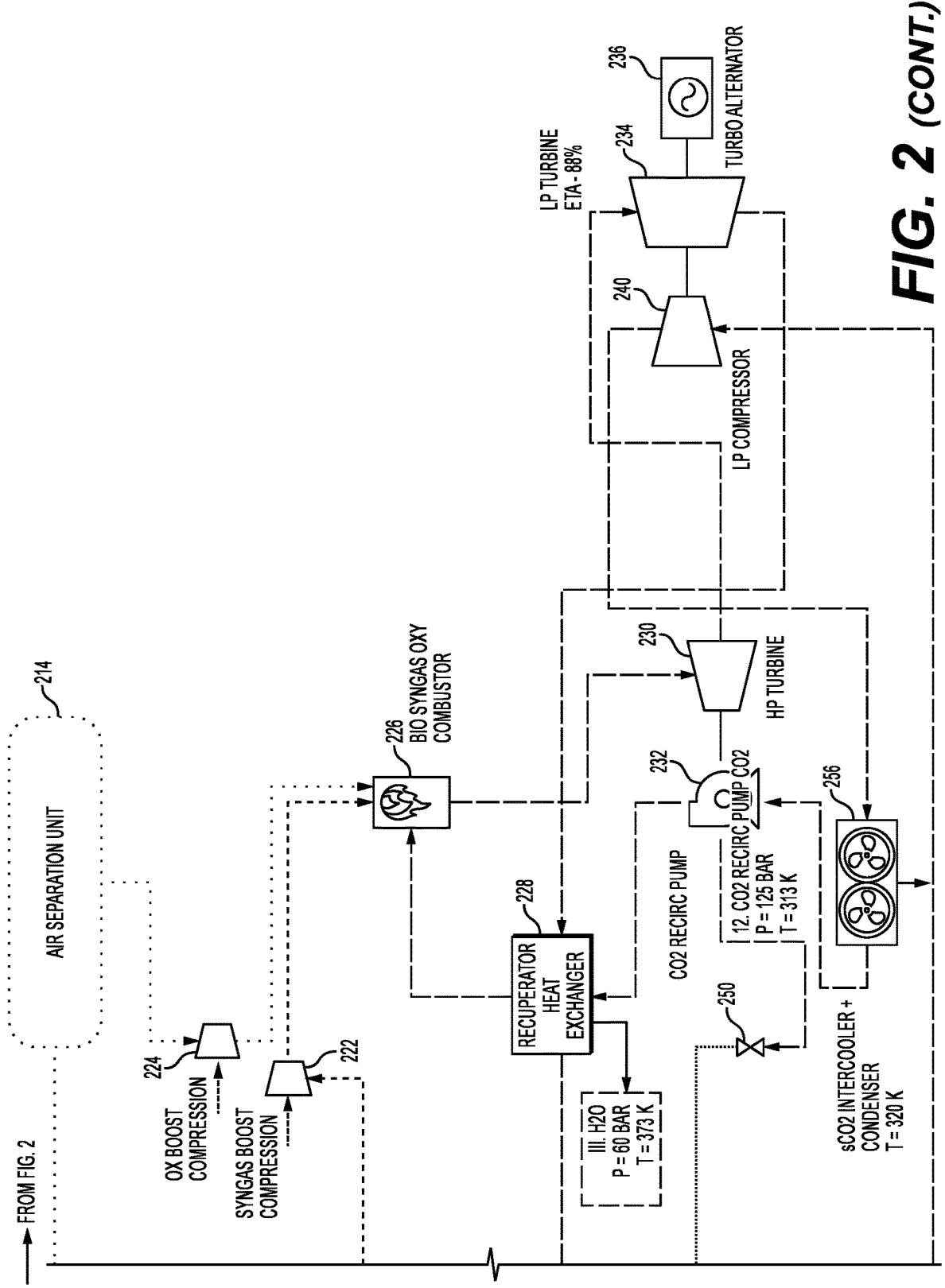

FIG. 2 is a diagram depicting an exemplary integrated carbon sequestration and power generation system 200 ("system"), according to one or more embodiments of the present disclosure. The system 200 may include a torrefaction reactor 202, a grinding system 204, a torrefied biomass conveyance system 206, a load and lock hopper 208, a feed hopper 210, a gasifier reactor vessel ("gasifier") 212, an air separation unit 214, a first $H_2O$ recirculation pump 216, and a scrubber 218. Collectively, these components may prepare biomass for use as fuel. System 200 may further include a low temperature heat exchanger 220, a syngas boost compressor 222, an oxygen boost compressor 224, a combustor 226, a recuperator heat exchanger 228, a high pressure turbine 230, a high pressure $CO_2$ recirculation pump 232, a low pressure turbine 234, and a generator 236 for producing power. In some aspects, system 200 may further include a direct action capture fan bank 238, a low/intermediate pressure compressor 240, a water condenser 242, a second $H_2O$ recirculation pump 244, a $CO_2$ compressor 246, and a designated storage location 248 for sequestering $CO_2$.

In an embodiment, suitable biomass, e.g., any carbon neutral or carbon negative fuel (such as agricultural products or waste, wood, trees, or underbrush cleared from forests, other organic waste, other municipal waste, any combination of the foregoing, and the like), may be pre-processed by a torrefaction process involving the torrefaction reactor 202. The torrefaction reactor 202 may be of any suitable type, including, but not limited to, a fixed bed reactor, a rotary drum reactor, a microwave reactor, a fluidized bed reactor, and/or a horizontal and vertical moving bed reactor. The torrefaction process may include drying, in the torrefaction reactor 202, the biomass and heating it in an oxygen-deprived environment. The heat generated by combustion of the torrefaction gas may be used for both torrefaction and drying of the biomass. Once the biomass reaches 200° C.-350° C., the reaction may become exothermic, and the products of the reaction may include water, oxygen, nitrogen in the biomass, and Volatile Organic Compounds (VOCs). The VOCs may be burned to generate heat for drying and initiating the biomass reaction. The VOCs may be burned in pure oxygen or air.

The biomass may come out of the torrefaction reactor 202 in a state that is easier to grind and may have other beneficial properties, such as increased carbon content density, hydrophobic behavior, higher heating value, more homogenous composition, removal of waste mass (e.g., water, or low-energy compounds) so that transport may be more efficient, etc. This torrefied biomass may be transferred into a grinding system 204 (e.g., a Stage-1 coarse grinder, a Stage-2 coarse grinder, bowl mill, impact hammer, jet mill, or other suitable systems utilized in coal grinding, or any combination thereof, etc.) in which the torrefied biomass is ground down to a suitable size and prepared for conveyance and pressurization into a gasifier injector, wherein the torrefied biomass may be partially oxidized to separate it into its constituents. More particularly, the ground, torrefied biomass may be conveyed from the grinding system 204 to a load and lock hopper 208 by components (e.g., conveyor belts, pneumatic systems, screws, buckets, etc.) of the torrefied biomass conveyance system 206. The pressurization into the gasifier injector may occur via pneumatic or mechanical modalities. Examples of mechanical pressurization include use of a solids conveyance pump, or a slurry formation of the ground biomass with other constituents to be pumped into the pressurized volume of the gasifier 212. If pneumatics are utilized, the biomass may be pressurized using an inert gas, such as $CO_2$ or $N_2$, which may be introduced into the load and lock hopper 208. For example, $CO_2$ siphoned away from other portions of system 200 may be diverted toward the load and lock hopper 208 via actuation of a 3-way valve 254 or other suitable flow control mechanisms. As used herein, suitable flow control mechanisms may include, e.g., valves, orifice plates, manifolds, backpressure regulators, etc., used alone or in combination with one or more sensors. The pressurized ground torrefied biomass may then be provided to a feed hopper 210, which may be configured to convey the pressurized ground torrefied biomass into the gasifier 212 at a predetermined controlled feed rate, e.g., via the gasifier injector. Although the torrefaction reactor 202, grinding system 204, and torrefied biomass conveyance system 206 are described herein and are depicted in FIG. 2, it is contemplated that one or more of these components may be omitted from system 200 if, for example, previously torrefied biomass is received by the system 200. In such an instance, system 200 may not need to be capable of running a torrefaction process and may be operable without utilization of one or more of the foregoing components if the biomass received into the system 200 (e.g., provided to the gasifier 212) is in an already torrefied state. In other embodiments, biomass may be introduced to the system that is not torrefied, e.g., biomass that is either untreated or is treated in a manner that does not include torrefaction.

In an embodiment, one of a variety of different types of gasifiers 212 may be utilized in the system 200, e.g., a fixed-bed gasifier, an entrained-flow gasifier, a fluidized-bed gasifier, or other suitable gasifier types. The pressurized biomass constituents may be injected into the gasifier 212 and may be reacted with oxygen ($O_2$) and injected steam in a gasification reaction. In an embodiment, the oxygen used in the gasification reaction may be obtained from an air separation unit 214 fluidly coupled to the gasifier 212 and provided to the gasifier 212. The air separation unit 214 may, for example, leverage vacuum pressure swing absorption (VPSA) or temperature swing adsorption (TSA) technology to separate air into its constituent components. In another embodiment, the oxygen may be obtained from a cryogenic oxygen separator. In another embodiment, the air separation unit 214 may be a cryogenic oxygen system. In yet another embodiment, the oxygen may be obtained from a dedicated oxygen delivery service or pipeline. The injected steam may be derived from one or more different sources. For example, water may be extracted from synthesis gas (syngas) prior to insertion into one or more compressors, as further described herein, and used as a basis for the injected steam. In addition or alternatively, water generated during combustion may be removed from the system, vaporized (e.g., with heat from the gasifier or a low temperature heat exchanger, etc.), and injected into the gasifier as steam.

The product of the foregoing reaction is a syngas mixture containing gaseous hydrogen ($H_2$), carbon monoxide (CO), and $CO_2$, along with trace amounts of species formed as a result of trace elements in the biomass. The solid products that cannot be gasified in the reaction are collected at the bottom of the gasifier 212 as molten slag and ash (e.g., fly ash, bottom ash, etc.). The solid products are the result of solid elements and compounds within the biomass, such as potassium, calcium, silica, etc. These solid products may be collected and repurposed for other utilizations, e.g., as fertilizer. For example, the molten slag may be utilized in the production of cement concrete for roads.

After the syngas is formed within the gasifier 212, it must be quenched down to usable temperatures before it can be sent downstream. These temperatures may be determined, at least in part, by the composition of the downstream components, such as scrubber 218. More particularly, the temperatures may be chosen so as to cool the syngas so that water may condense in scrubber 218 in order to remove dirty chemicals. Such a process may be facilitated by introducing water or $CO_2$ from other portions of system 200 into the gasifier 212. For example, the water may be derived from the low temperature heat exchanger 220 or the recuperator heat exchanger 228 and provided to the gasifier, e.g., via pump 216. As another example, water extracted from the biomass drying in the torrefaction reactor 202 may be utilized. If water from within system 200 is reused, this water may need to be cleaned or otherwise processed prior to use. Alternatively or additionally, water may be supplied from an external source, such as a water plant or a body of water. In an embodiment, $CO_2$ may be introduced into the gasifier 212, e.g., from the low pressure compressor 240. In other embodiments in which the gasifier is run at a higher pressure, the $CO_2$ may be introduced into the gasifier from the high pressure recirculation pump 232. The introduction of water or $CO_2$ to quench the syngas may enable formation of non-liquid ashes on the condensable species. The ashes may be recovered and removed from the main flowpath of the machinery that makes power, which may allow for longer operation of the machinery. The non-liquid ash is biogenic in nature and may be mostly composed of minerals and compounds used by the biomass. These can be delivered back into the biodome where they were taken from. Additionally or alternatively, they may be extracted and utilized as fertilizer. After the syngas leaves the gasifier 212, the water may be removed, e.g., via the scrubber 216 or the low temperature heat exchanger 220. The $CO_2$ may be kept in the stream for oxyfuel combustion purposes and expanding in the turbine system downstream.

In an embodiment, the syngas may leave the gasifier 212 and be transported into the scrubber 216, where it may be processed in order to remove ash particulates and halides in order to produce a syngas that is clean burning and will not negatively affect the machinery downstream of the main combustion system. Additionally or alternatively, the syngas may be processed with one or more candle filters or other available gas processing systems to remove particulate contaminants.

Figure 6:
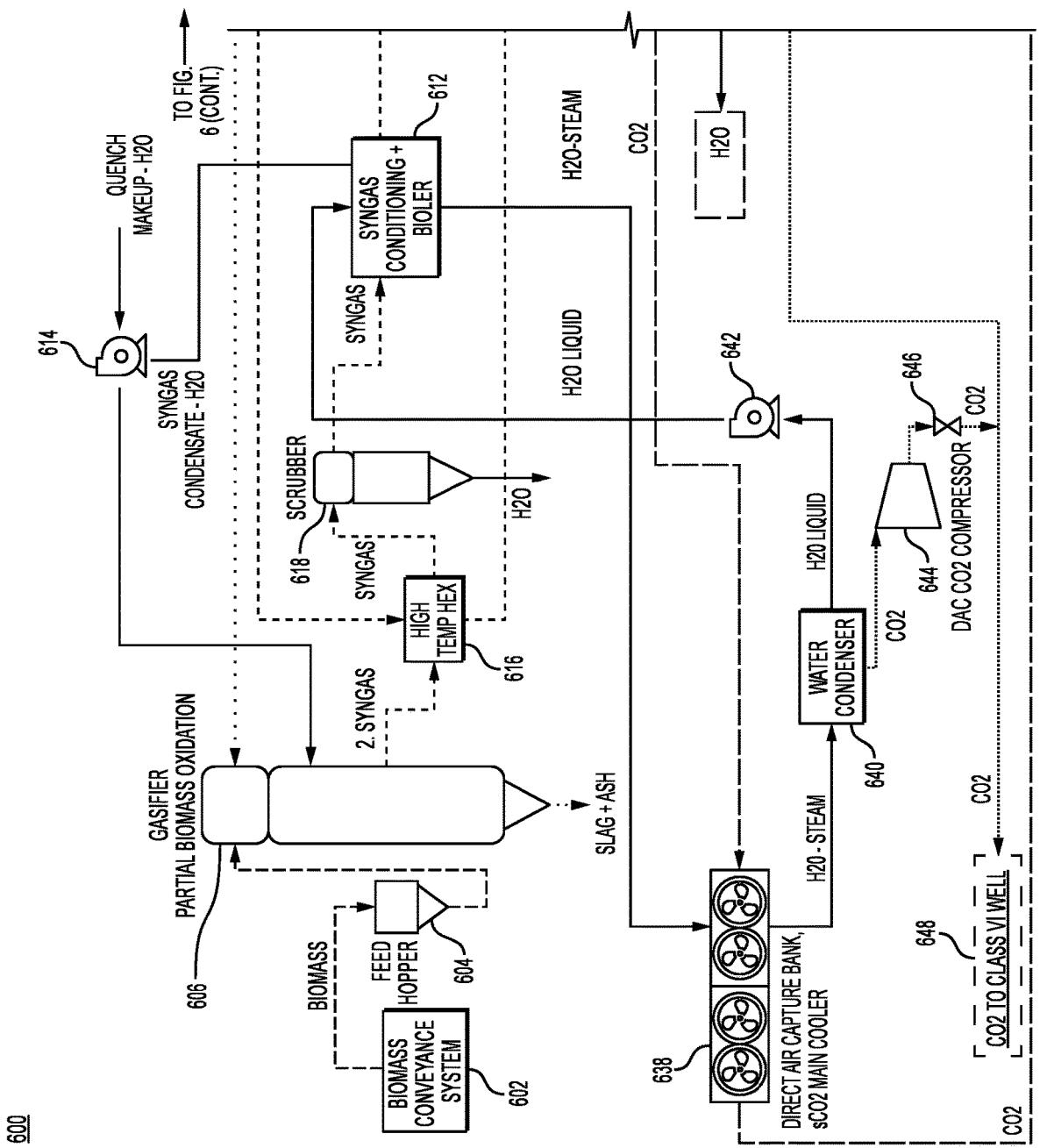
FIG. 6 depicts a schematic illustration of another exemplary integrated carbon sequestration and power generation system, according to various aspects of the present disclosure.
Figure 6:
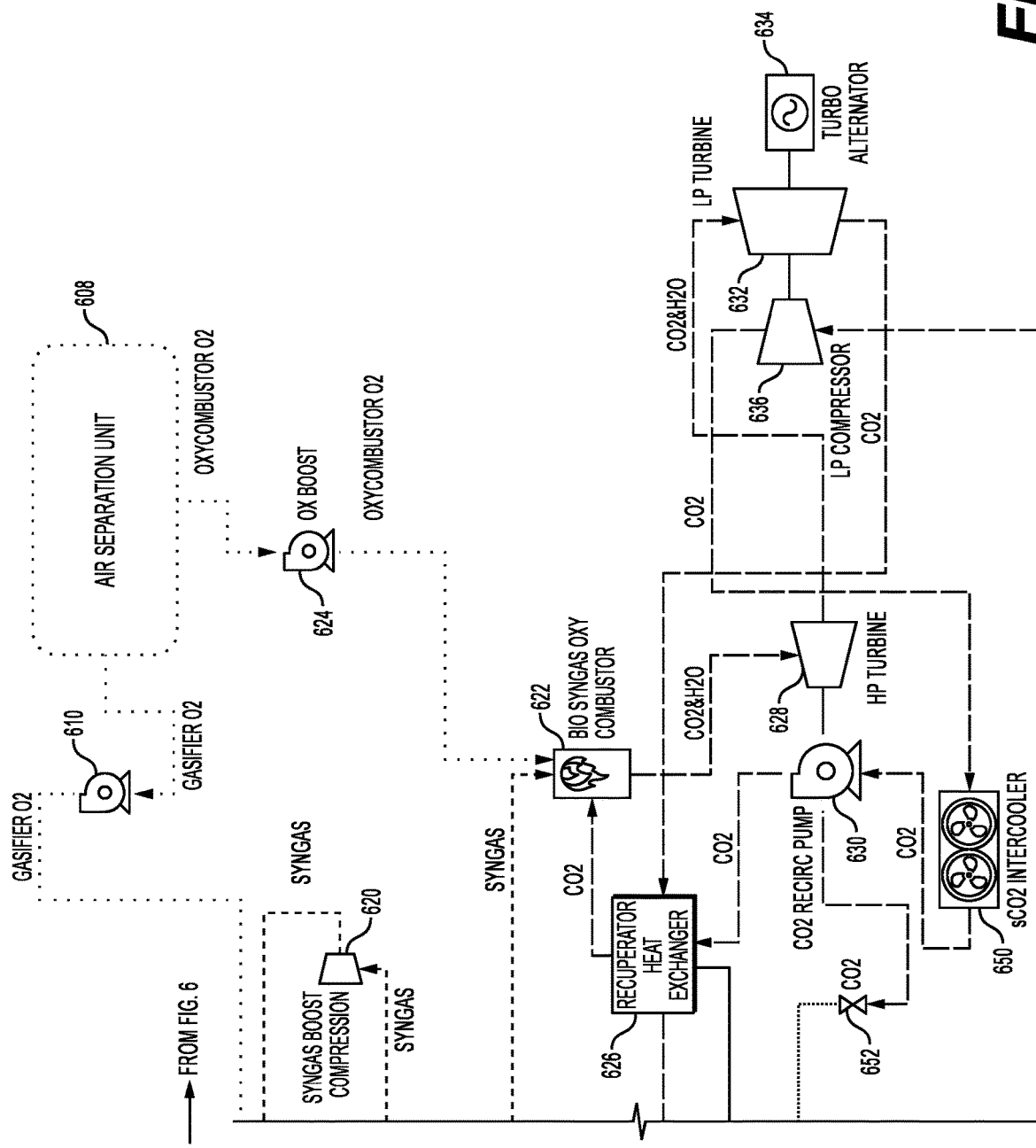

After exiting the scrubber 216, the syngas may pass through a low temperature heat exchanger 220. The syngas heat from the gasification oxidation reaction may be removed at the low temperature heat exchanger 220, which may be placed at a low temperature suitable for steam extraction, thereby acting as a syngas cooler. In an embodiment, this steam may be utilized to remove captured $CO_2$ from sorbent material in a direct air capture fan bank 238 of an integrated direct air capture carbon system, as further described herein. For instance, after the scrubber, there may be a large amount of steam and/or saturated water in the syngas. This steam and/or saturated water may be used to boil another, lower pressure water stream (e.g., one that is situated at ambient pressure) to steam in the low temperature heat exchanger 220, which may then be routed to regenerate the sorbent in the direct air capture fan bank 238. In some aspects, this steam may be introduced into gasifier 212 to promote hydrogen formation in the gasifier and, specifically, to use water shift to change how much $H_2$ and CO are in the syngas. Additionally or alternatively, the extracted heat from the syngas may be provided to the $CO_2$ cycle (e.g., in which $CO_2$ and/or $sCO_2$ is used as the working fluid, etc.) to increase efficiency. It is important to note that although FIG. 2 only illustrates that the syngas passes through a single heat exchanger (i.e., the low temperature heat exchanger 220), such a designation is not limiting. For example, in an embodiment, the system 200 may contain two heat exchangers that may be configured to pull and cool the syngas (e.g., the low temperature heat exchanger 220 and another heat exchanger positioned between the gasifier 212 and the scrubber 218, as illustrated in FIG. 6, which is later described herein). The other heat exchanger may be a high-temperature heat exchanger, which may be operable to generate more steam.

Additionally or alternatively, in some implementations, the gasifier 212 may have cooling water in its jacket/liner and may contain an integrated heat exchanger inside. In some embodiments of the systems described herein (e.g., systems 100, 200, 500, 600, 700), heat may be additionally or alternatively removed from the cooling elements of the gasifier jacket/liner, or from cooling elements associated with one or more other components of the system. In such an embodiment, heat may be removed directly through cooling of a component of the disclosed systems (e.g., a gasifier liner of, for example, system 100, 200, 500, 600, 700), in conjunction with or as opposed to removing heat by cooling the syngas product (e.g., cooling may be achieved via the liner, the syngas, or a combination thereof). The removed heat may be directed to other components of the disclosed systems in order to increase the efficiency of the systems. For example, steam from syngas heat rejected by the low temperature heat exchanger 220 may be directed to a DAC bank 238 to remove the $CO_2$ gas from the sorbent materials, as further described herein. Systems described herein provide examples of where heat may be pulled from and re-directed to in order to increase the overall efficiency of such systems.

Once the syngas is fully cooled and dried, it may be compressed to full pressure (which is a suitable combustion injection pressure, e.g., approximately 415 bar) if needed by, for example, a syngas boost compressor 222, which is configured to increase the temperature and pressure of the syngas. For example, in an exemplary flow, the cooled syngas leaving the low temperature heat exchanger 220 may enter the syngas boost compressor 222 at a pressure of approximately 40 bar and a temperature of approximately 350° K. The compressed syngas stream exiting the syngas boost compressor 222 may have a pressure of approximately 413 bar and a temperature of approximately 685° K.

After being compressed, the syngas may be introduced into a combustor 226 (e.g., a bio syngas oxy combustor) where it may be fully oxidized (e.g., with an oxygen stream derived from the air separation unit 214 and compressed via an oxygen boost compressor 224), thereby creating a stream of mostly water and $CO_2$. The stream resultant from the oxidation reaction between the syngas and oxygen stream may be combined in the combustor 226 with a recirculated stream of mostly $CO_2$. The recirculated stream of $CO_2$ may have been passed through a recuperator heat exchanger 228 to preheat it to an amenable temperature for the cycle to have acceptable thermodynamic efficiency (e.g., a thermodynamic efficiency that ensures that power is left to run all the supplemental power requirements of system 200). More particularly, an inlet of recuperator heat exchanger 228 may be configured to receive $CO_2$ streams having temperatures of about 800° K to about 900° K. The $CO_2$ exhaust stream exiting recuperator heat exchanger 228 may have a temperature in the range of about 725° K to about 825° K.

In an embodiment, a pressure and temperature of an exemplary combustion stream exiting the combustion outlet of the combustor 226 may be approximately 375 bar and approximately 1036° K, respectively. The combustion stream may be diluted and may then be expanded in a turbine, e.g., a first turbine 230 (i.e., a high pressure turbine). The high pressure turbine 230 may be a direct fired turbine and is the first main engine turbine to receive the combustion stream from the combustor 226. It is designed to efficiently extract work out of the high pressure combustion stream, which is thereafter utilized to power the main cycle recirculation pump 232, the operation of which is further described below.

In an embodiment, after the combustion stream goes through expansion at the first turbine 230, a pressure and temperature of an exemplary first turbine exhaust stream may be approximately 281.3 bar and approximately 995° K, respectively. The turbine exhaust stream may be injected into a second turbine 234 (i.e., a low pressure turbine) to fully expand to its lowest pressure level in the cycle. The second turbine expansion may provide power to a generator 236 (i.e., a turbo alternator) that is attached mechanically to a rotor of the second turbine 234 and to a low/intermediate pressure compressor 240.

While a first turbine and a second turbine are described herein, it is contemplated that one, two, or three or more turbines may be incorporated.

Energy generated by the generator 236 may be utilized in a variety of different ways based on the operating mode of the system 200. For instance, in a first operating mode, the system 200 may behave as a power plant, and the power generated by the generator 236 may be output from the system 200. For example, power may be output in the form of electricity and sent to a power grid, which may be associated with a third party (e.g., an energy provider). In some aspects, power may be output in the form of mechanical power. In a second operating mode, the system 200 may behave as a $CO_2$ capture system, and the power generated by the generator 236 may be utilized to provide power to components of a DAC system (e.g., air-contacting fans and compressors). In a third operating mode, the system 200 may be configured to distribute the power from the generator 236 to both the power grid and to the DAC system. Additional details regarding the various operating modes of the system 200 and the power redirection paths are further described herein.

In an embodiment, after the combustion stream goes through expansion at the second turbine 234 (if more than one turbine is used), a pressure and temperature of an exemplary second turbine exhaust stream may be approximately 63 bar and approximately 800° K. The second turbine discharge stream is then passed through a recuperator heat exchanger 228. Although one recuperator heat exchanger 228 is depicted in FIG. 2, more than one heat exchanger may be incorporated in system 200. The recirculating $CO_2$ stream from the high-pressure recirculation pump 232 may also be introduced to recuperator heat exchanger 228. This allows the second turbine discharge stream to exchange heat with the recirculating $CO_2$ stream pump from the high-pressure recirculation pump 232, thereby heating the recirculating $CO_2$ stream as it is directed to the main combustor 226 and cooling the second turbine discharge stream as it is being directed to a DAC fan bank 238. In various embodiments described herein, heat in the $CO_2$ stream having passed through recuperator heat exchanger 228 may be used to boil water at the low temperature range of recuperator heat exchanger 228. In some aspects, heat may be pulled from recuperator heat exchanger 228 directly, instead of pulling heat from a $CO_2$ stream. In still other aspects, heat may be pulled from low or high pressure heat exchanger streams. Pulling heat in this manner may increase thermal power at lower quality temperatures, increasing the efficiency of system 200. Referring back to the embodiment of FIG. 2, the second turbine discharge stream may lose the majority of its water upon passage through the recuperator heat exchanger 228. This water may be repurposed for utilization in other aspects of the system 200 (e.g., as quench water provided to the gasifier 212, as steam provided to sorbent material of a direct air capture system, etc.).

In an embodiment, after passage through the recuperator heat exchanger 228, a pressure and temperature of an exemplary second turbine discharge stream (i.e., the recuperator exhaust stream) may be approximately 60 bar and approximately 360° K to approximately 375° K. The cooled second turbine discharge stream may be directed to pass through the DAC bank 238. An outlet of the DAC bank 238 may be held at approximately 320° K to remove the rest of the heat in order to return the stream to approximately ambient temperature, e.g., of about 320° K or less. In an embodiment, the DAC bank 238 may reject heat via conduction at a given temperature that is amenable to use in direct air carbon sequestration sorbent regeneration (e.g., 300° K-322° K). More particularly, the DAC bank 238 may include a piping manifold that is interconnected with low temperature $CO_2$ sorbents. In an embodiment, one type of $CO_2$ sorbent may be a metal-organic Framework (MOF), e.g., "mmen-Mg2(dobpdc)." The MOF sorbents have been shown to be suitable in the regeneration process (i.e., the process by which the sorbent materials are made reusable for another cycle). For example, MOF-based technology may be capable of regenerating at temperatures of about 353.15° K to about 393.15° K, which may be less energy intensive and costly. Other embodiments may leverage other types of low temperature $CO_2$ sorbents, such as zeolite materials or ammonia based sorbents. Non-limiting types of low temperature $CO_2$ sorbents may include, for example, liquid amines (e.g., monoethanolamine (MEA)), solid amines (e.g., amine-functionalized cellulose, amine-functionalized silicas), zeolites (e.g., Zeliote 13X (Na86[(AlO2)86(SiO2)106]·nH2O), Zeliote 4A (Na12[(AlO2)12(SiO2)12]·nH2O)), covalent organic frameworks (COFS) (e.g., COF-609), or one or more other types of MOFs (e.g., MOF-74).

In an embodiment, to facilitate the carbon capture, atmospheric air may be passed through a plurality of fans of the DAC bank 238 to cool the sorbent and allow it to come in contact with the air. In some embodiments, the fans of DAC bank 238 may be used as fans for condenser units utilized in the $CO_2$ loop, thereby increasing system efficiency by taking advantage of the power utilized to run DAC bank 238. As the air comes in contact with the sorbents, $CO_2$ from the air is trapped in a charge cycle. For the discharge cycle, the cooled second turbine discharge stream may be used to heat the sorbent material in the DAC bank 238 (e.g., via conduction). This preheats the sorbent material to allow it to accept the steam from the syngas heat rejected by the low temperature heat exchanger 220. This steam is used to remove the $CO_2$ gas from the sorbent materials. Preheating the sorbent material, using heat from the system to generate steam, or using already produced steam from the system may reduce the amount of energy needed to perform carbon capture, and may increase the efficiency of the system. In some embodiments, instead of just preheating the sorbent material, aspects of the system may be configured to enable the cooled second turbine discharge stream—or heat pulled from other heat sources within system 200—to provide substantially all heat necessary to run the DAC bank 238. The freed $CO_2$-containing stream is passed through a condenser 242, in which water in the freed $CO_2$-containing stream is removed and pumped, via pump 244, back to the low temperature heat exchanger 220 to be utilized in a continuous loop. The $CO_2$ stream formed by the $CO_2$ released from the sorbent may then be compressed in a $CO_2$ compressor 246 and sent to a pipeline via valve 252 or other suitable flow control mechanism. In one embodiment, the pipeline may transport the sequestered $CO_2$ to a designated underground storage location. For example, the $CO_2$ may be transported to a well 248, which may be a class VI well. In another embodiment, the pipeline may transport the sequestered $CO_2$, e.g., to one or more other contracting entities. In some aspects, at least a portion of the $CO_2$ released from the sorbent may be directed to other components of system 200, e.g., to the lock and load hopper 208, as opposed to a pipeline or storage. For example, $CO_2$ diverted to lock and load hopper 208 may be used to pressurize biomass prior to introduction into gasifier 212. The three-way valve 254 or other component may be used to optionally direct $CO_2$ to either a pipeline/storage or to load and lock hopper 208.

In an embodiment, after passage through the direct air capture bank 238, a pressure and temperature of an exemplary cooled $CO_2$ stream may be approximately 131 bar and approximately 360° K. The cooled $CO_2$ stream may then be transported to a low/intermediate pressure compressor 240 to go through the critical point to form, in some embodiments, $sCO_2$ before being injected into the high pressure recirculation pump 232, configured to increase the pressure of the $CO_2$ stream to combustion injection pressures. For example, the recirculating pump discharge stream may have a pressure and temperature of approximately 417 bar and approximately 360° K. In an embodiment, one or both of the cooled $CO_2$ stream exiting the DAC bank 238 and the compressed $CO_2$ stream exiting the low/intermediate pressure compressor 240 may be cooled by another cooler 256 to increase efficiency. The recirculating pump discharge stream may then be heated via passage through the recuperator heat exchanger 228 and then recycled back into the combustor 226. After passing through the recuperator heat exchanger 228, the stream may have a pressure and temperature of, e.g., approximately 396 bar and approximately 730° K. In an embodiment, the $CO_2$ that was created in the combustion process may be siphoned through a 3-way valve or other suitable flow control mechanism (e.g., an orifice plate configured to throttle the amount being rejected, or via leakage passages inside the main pump flow region, etc.) at a pressure that is ready for pipeline injection or liquefied transport through highway into the well 248 (as directed, e.g., by valves 250 and 254 or other suitable flow control mechanism). Suitable pipeline injection pressures may be approximately 142 bar. In an embodiment, the low/intermediate pressure compressor sections may utilize intercooling to increase cycle efficiency (however this is not necessary for the system 200 to operate).

It is important to note that effective operation of the system 200 may be achieved with fewer or greater components. Stated differently, the number and type of components illustrated in FIG. 2 is only exemplary, and other embodiments may be viable in which fewer components are present but may nevertheless accomplish the same outcome.

Figure 3:
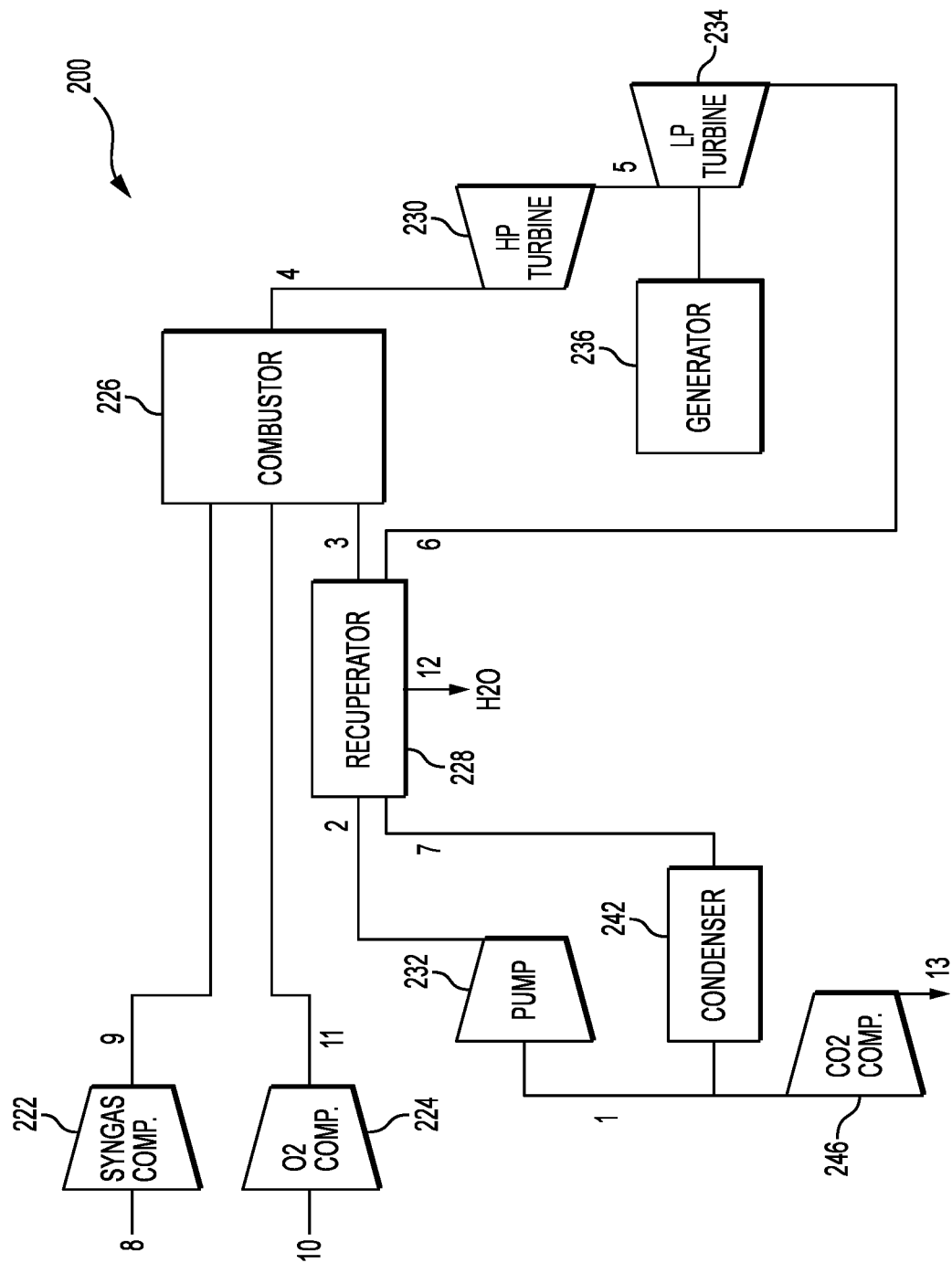
FIG. 3 depicts exemplary thermodynamic states of pressure and temperature of the system of FIG. 2, according to various aspects of the present disclosure.

FIG. 3 depicts a simplified version of power generating portions of system 200 of FIG. 2. Additionally, Tables 1 and 2 depicted below provide exemplary thermodynamic states at various locations throughout system 200. It is important to note that the provided temperatures and pressures are only examples, and they may change, e.g., depending on the size of the power plant, the type of biomass being used, variation in carbon content of the syngas, the efficiency of the power cycle, or other factors or combinations of factors. In an embodiment, this cycle may allow for operation at high pressures to avoid the $CO_2$ density gradients above the vapor dome, which may cause operation problems in the turbomachinery systems if the heat rejection step is done to atmosphere. If the pressure entering the pump is close to the vapor dome of the $CO_2$ (when it becomes gas, and is out of the supercritical state), the temperature that the inlet of the pump is cooled to may affect the density of the fluid to the point that the pump system in the cycle cannot function. Accordingly, the inlet pressure condition of the pump may be placed at a higher pressure than the critical pressure of $CO_2$, as the fluid density gradients may be less sensitive to inlet temperature conditions. This may allow system 200 to operate with heat rejection that is independent of water requirements (i.e., uses air to cool the cycle).

TABLE 1

| Point Units | Pressure Bar | Temperature K. | Mass Flow kg/s |
|---|---|---|---|
| 1 | 125 | 313 | 105 |
| 2 | 395 | 357 | 105 |
| 3 | 375 | 750 | 105 |
| 4 | 355 | 916 | 112.89 |
| 5 | 258 | 872 | 112.89 |
| 6 | 137.5 | 790 | 112.89 |
| 7 | 130.6 | 365 | 110.92 |
| 8 | 55 | 300 | 5.05 |
| 9 | 390 | 472 | 5.05 |
| 10 | 55 | 300 | 2.84 |
| 11 | 390 | Not modeled | 2.84 |
| 12 | 1 | 365 | 1.97 |
| 13 | 150 | 320 | 5.92 |

TABLE 2

| Point Units | Temperature K. | Pressure Range bar | Temperature Range K. |
|---|---|---|---|
| Compressor Suction | 1 | 313 | 30-65 | — |
| Compressor Discharge | 2 | 381 | 140-400 | — |
| Recuperator Outlet | 3 | 807 | 140-400 | 700-950 |
| Combustor Outlet | 4 | 1054 | 130-200 | 900-1350 |
| HP Turbine Outlet | 5 | 935 | 70-200 | — |
| Power Turbine Outlet | 6 | 839 | 30-65 | 700-950 |
| Recuperator Outlet | 7 | 391 | 30-40 | 300-400 |
| Syngas from Gasifier | 8 | 320 | 30-50 | — |
| Syngas to Combustor | 9 | 370 | 140-400 | — |
| Oxygen from ASU | 10 | 290 | 40-80 | — |
| Oxygen to Combustor | 11 | 365 | 140-400 | — |
| Water from Cycle | 12 | 313 | 20-40 | — |
| Product CO2 | 13 | 320 | 35-150 | — |

Figure 4:
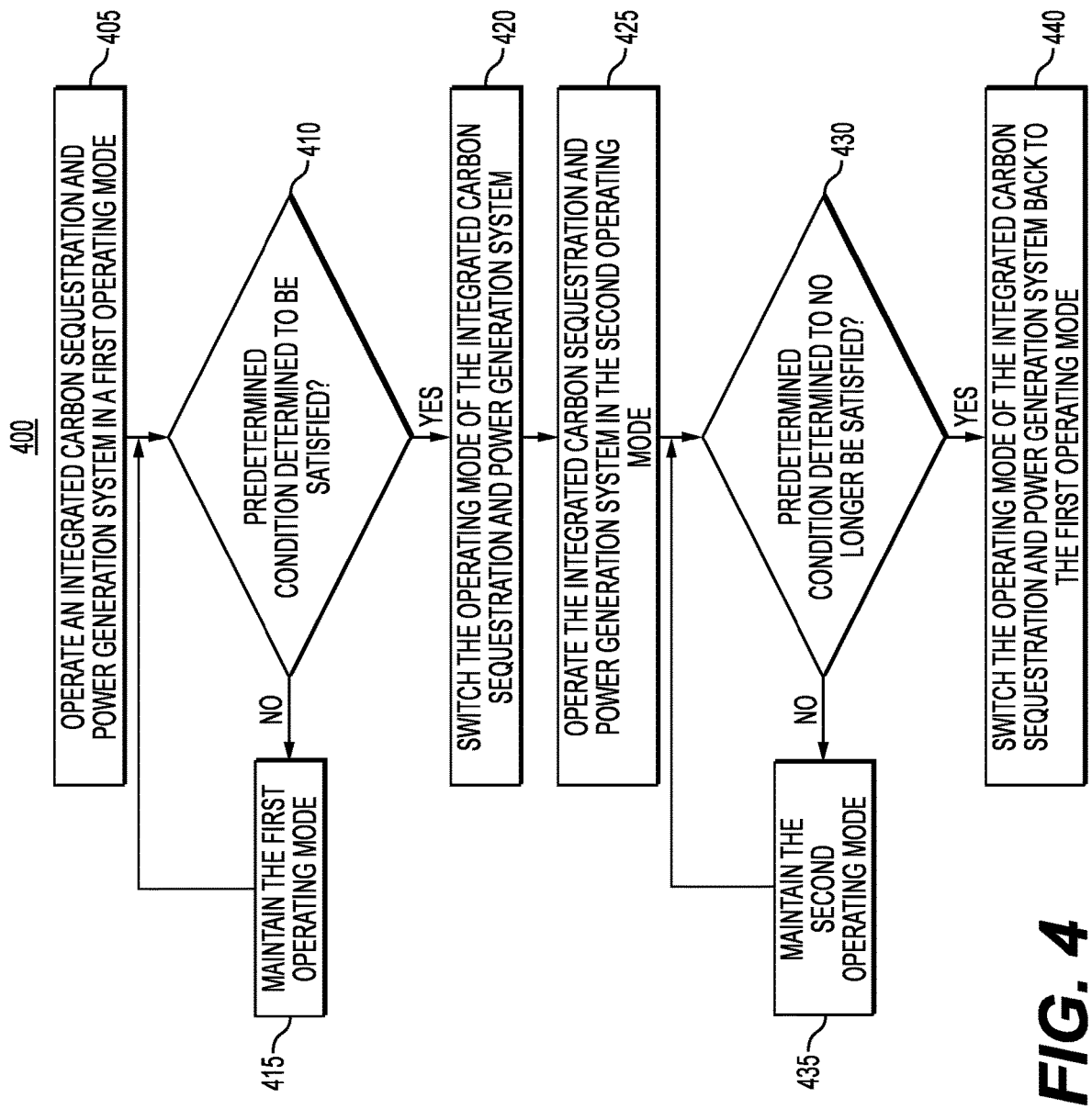
FIG. 4 depicts an exemplary flow of operating an integrated carbon sequestration and power generation system, according to various aspects of the present disclosure.

Referring now to FIG. 4, an exemplary method of operating an integrated carbon sequestration and power generation system, e.g., switching an operating mode of an integrated carbon sequestration and power generation system, is disclosed. The exemplary process flow 400 may be implemented by the components of the system 100, 200.

As previously described above, the system 100, 200 may be capable of operating in a variety of different operating modes, wherein the power produced by the generator 236 of the system 100, 200 (e.g., as a result of expansion of the combustion stream across the low-pressure turbine 234) may be provided to a specific destination and may be utilized to divert power to specific components based on the selected operating mode. The system 100, 200 may switch between the operating modes without changing the operation of the cycle, thereby enabling the system 100, 200 to have diverse utility and allowing it to participate in a variety of different markets. Although flow 400 is described in conjunction with a computer control system, it is contemplated that flow 400 may proceed either manually or automatically.

At step 405, a computer control system may cause the system 100, 200 to operate in a first operating mode. In an embodiment, the system 100, 200 in the first operating mode may be configured to direct the energy produced by the turbine generator 236 to power a DAC carbon sequestration system that is integrated as part of the system 100, 200. In this regard, the power may be directed by actuating switching relays, as governed by the computer control system, to activate and power one or more air-contacting fans in the DAC bank 238 as well as the DAC $CO_2$ compressor 246. Once activated, the DAC system may operate to capture and sequester atmospheric carbon. Furthermore, the system 100, 200 may configure itself or may manually be configured to provide heat from thermodynamic power cycle 110 (e.g., a recuperated Brayton thermodynamic power cycle) into the sorbent materials contained in the DAC bank 238 (e.g., via conduction heat provided by the exit flow from the recuperator heat exchanger 228, etc., as described above).

At step 410, the computer control system may determine whether a predetermined condition is satisfied. In an embodiment, satisfaction of the predetermined condition may initiate redirection of the power produced by the turbine generator 236 to a second destination, as described in steps 420 to 425. Alternatively, if the predetermined condition is not satisfied, the computer control system may maintain the system 100, 200 in the first operating mode, as described in step 415. A plurality of potential types of predetermined conditions are contemplated herein, and are further described below.

In an embodiment, the determination of whether the predetermined condition is satisfied may correspond to an identification of whether one or more other power sources are available to supply power to a power grid. For example, the predetermined condition may correspond to whether a power grid operator has access to another type of renewable energy to provide power to the power grid. The predetermined condition may be considered satisfied responsive to determining that the power grid operator entity does not have access to the other types of renewable energy. For context, and further to the foregoing, the cost of power may fluctuate throughout the day, with certain periods being more expensive than others. These fluctuations may be based, in part, on the types of renewable energy (e.g., solar energy, wind energy, etc.) that the power grid operator has access to. Specifically, renewable energy providers may be able to provide power to the power grid operator at a lower cost than conventional gas and/or coal-powered power plants are able to. Accordingly, when renewable energy sources are available, the cost of power may be relatively lower because the power grid operator may obtain power for their power grid at a lower cost. However, when conditions prevent the renewable energy providers from operating (e.g., due to no or low sunlight or wind, poor weather conditions, etc.), the power grid operator may need to obtain power for their power grid at a relatively higher cost because it may be relatively more expensive to derive energy from gas and/or coal powered plants. These periods of high electricity cost, or "peaker" periods, may be periods of time that occur daily (e.g., at night when solar power sources are unavailable) and/or may last for an extended time (e.g., several days or weeks depending on weather, etc.).

The computer control system may be configured to anticipate when the renewable energy providers will be unable to operate and generate renewable energy. For instance, in an embodiment, the computer control system may receive an indication from a timer or sensor that may be configured to provide an alert to the computer control system each day at a predetermined time. The predetermined time may be an estimated time by which the renewable energy providers are no longer able to provide power to the power grid. In an embodiment, the predetermined time may be static (i.e., the same each day) or may be dynamic and may adjust throughout the year. In another embodiment, the computer control system may have access to historical sunlight data for the relevant geographical region (e.g., stored in a database, accessible via an online source, etc.), which may provide indications of the average daily sunrise and sunset times throughout the year. Solar-based energy providers may be operable during the periods between sunrise and sunset and inoperable during the periods between sunset and sunrise. Accordingly, the computer control system may associate a known daily sunset time as the end of the power grid operator's ability to receive renewable energy for the day. In another embodiment, the computer control system may access weather forecast data (e.g., from an online source, etc.), which may provide indications of upcoming weather events that may affect a renewable energy provider's ability to produce renewable energy. For example, if the weather forecast data for an upcoming day predicts cloudy and/or stormy conditions, the computer control system may identify that a solar energy provider's ability to produce power may be limited during those times. In another example, if the weather forecast data predicts a severe storm or weather event (e.g., a winter storm, hurricane, tornado, etc.), then the computer control system may identify that a solar energy provider's ability to produce power may be impaired for an extended period of time (e.g., several days, etc.). In a further example, if the weather forecast data for an upcoming day predicts there to be little or no wind, the computer control system may identify that a wind energy provider's ability to produce power may be limited during those times.

Additionally or alternatively to the foregoing, in an embodiment, the determination of whether the predetermined condition is satisfied may correspond to an identification of whether an increased load is required by a power grid of a power grid operator. The predetermined condition may be considered satisfied responsive to determining that the increased load required by the power grid is greater than a predetermined threshold. More particularly, in an embodiment, various types of events may occur that place additional stress on a power grid. Some of these events may be scheduled, whereas others may not be. For instance, with respect to the former, a major concert, sporting event, festival, etc., occurring in a region may require additional power to be provided by the power grid. The computer control system may have access to a schedule of these events and may anticipate which event may place a load demand on the grid that is greater than the predetermined threshold. In another example, with respect to the latter, a weather event may occur that increases the load demand required by the power grid (e.g., unexpected heat wave that may cause individuals to run their air conditioners or fans more than usual, a cold stretch that may cause people to use more heat than usual, etc.). In these situations, the computer control system may receive an indication (e.g., from the power grid operator) or otherwise determine that the load demand on the power grid is greater than the predetermined threshold.

Additionally or alternatively to the foregoing, in an embodiment, the determination of whether the predetermined condition is satisfied may correspond to an identification of whether a power grid of a power grid operator is becoming destabilized. In an embodiment, destabilization of the power grid may occur, for instance, because various assets relied on by the power grid operator may fail (e.g., other power providers that are contracted to provide power to the grid are unable to do so). These assets may fail as a result of various situations such as experiencing operational issues, damage derived from weather, geological, and/or other natural disaster events (e.g., damage from fire, earthquake, flood, etc.), and the like. In an embodiment, the predetermined condition may be considered satisfied responsive to anticipating that the power grid will become destabilized within a predetermined time threshold or for greater than a predetermined time threshold.

Additionally or alternatively to the foregoing, in an embodiment, the determination of whether the predetermined condition is satisfied may correspond to an identification of whether a revenue projection for operating the system 100, 200 in a second operating mode is greater than operating the system 100, 200 in the first operating mode. The predetermined condition may be considered satisfied responsive to determining that operating the system 100, 200 in the second operating mode is more profitable. As further described herein, the system 100, 200 may operate in a first or second operating mode. When in the second operating mode, the system 100, 200 may be configured to redirect the power produced by the generator 236 to a power grid of a power grid operator. In an embodiment, the system 100, 200 may reconcile whether a first projected value generated by or derived from sequestering and selling $CO_2$ (e.g., the collective revenue obtained from selling $CO_2$ at a contract or spot price to a third party, from carbon sequestration tax breaks, etc.) may be greater than a second projected value generated from providing power to the power grid. Responsive to determining that the projected value is greater for operation in the second mode, e.g., in a mode that diverts generated power to the power grid, the predetermined condition may be considered satisfied.

Responsive to determining, at step 410, that the predetermined condition is not satisfied, the computer control system may, at step 415, maintain the operating mode of the system in the first operating mode. Conversely, responsive to determining, at step 410, that the predetermined condition is satisfied, the computer control system may, at step 420, initiate switching an operating mode of the system 100, 200 from the first operating mode to the second operating mode. Once switched to the second operating mode, the computer control system may cause, at step 425, the system 100, 200 to operate in the second operating mode to redirect the energy from the DAC system to a power grid.

In an embodiment, the system 100, 200 in the second operating mode may output power produced by the generator 236 in an electrical or mechanical form. For simplicity purposes, the majority of this disclosure is described with reference to examples in which electrical power is output and, more specifically, to situations in which the system 100, 200 may act as a power plant and may be configured to direct the power produced by the generator 236 directly to a power grid of a power grid operator, but any output of power is contemplated. Once switched to the second operating mode, the DAC system may be turned substantially off (i.e., only the fans that are needed to reject the heat from the $CO_2$ stream at the bottom of the power cycle may be utilized), and the syngas low temperature steam may be utilized to preheat any of the fluids in the power cycle. Alternatively to the foregoing, the second operating mode of the system 100, 200 may be an "intermediate" mode in which the system 100, 200 is configured to direct a first portion of the energy produced by the generator 236 to components of the DAC system and a second portion of the energy to a power grid. In an embodiment, the system 100, 200 in the intermediate mode may only power a subset of the air-contacting fans in the DAC bank 238, and the $CO_2$ compressor 246 may be run at a lower power condition according to the appropriate amount of $CO_2$ collected in the DAC system.

In an embodiment, the switching, at step 420, may be facilitated by actuating a series of valves configured to control transport of the working fluid $CO_2$ through the system 100, 200. More particularly, the valving may be used to direct the $CO_2$ heat flows into more contactors or coolers, depending on the operating mode being switched to. In an embodiment, the system 100, 200 may be operable to switch back and forth between the two operating modes without changing the operation of the supercritical cycle. More particularly, the $CO_2$ heat flows may be managed as the $CO_2$ sorbent packs are regenerated in order to promote regular or constant heat rejection on the s$CO_2$ cycle. For instance, switching the operating mode from a power plant or power supply mode to a carbon sequestration mode may involve a plurality of steps. In power plant mode, in which energy may be generated and, e.g., output to a power grid, the power cycle may reject heat using a subset of fans from the contactor bank. Responsive to detecting an indication to initiate the switch between modes, the system 100, 200 may begin directing more power to the DAC bank 238 (e.g., in a controlled manner following structural considerations set by the DAC system). As more power is directed away from the grid and to the DAC bank 238, the amount of air scrubbing performed by the system 100, 200 may correspondingly increase. $CO_2$ working fluid from the cycle may be directed to the contactors while scrubbing of the air is performed. Additionally or alternatively, heat may also be sent from at least the low temperature heat exchanger 220 (i.e., the syngas cooling system) to the DAC bank 238. Upon detection that a predetermined number of contactors in the DAC bank 238 are saturated with $CO_2$ from the atmosphere, the system 100, 200 may be configured to dynamically remove at least a subset of fans from operation and to start utilizing conduction to heat the sorbents to a predetermined temperature, thereby rejecting its heat to the sorbent and initiating the process to release $CO_2$. Supplemental cooling of the $CO_2$ working fluid in the cycle may be achieved by sending the $CO_2$ working fluid to other saturated sorbent banks in series (if needed). More and more power may be directed to the DAC bank 238 until all power is directed to the DAC bank 238, and the system is in carbon sequestration mode.

In the reverse scenario, the system 100, 200 may initiate a switch from a carbon sequestration mode to a power plant mode. Upon detecting initiation of this switch, the system 100, 200 may begin reducing power to fan modules in the DAC bank 238, turning off banks of fans, and thereby reducing the air scrubbing potential of the system 100, 200. As the system is switched to the carbon sequestration mode and power in the fan modules is reduced, heat rejection may be concentrated on a subset of contactors, which are allowed to saturate with $CO_2$. For example, valving may be utilized to direct hot $CO_2$ (that which preheats the sorbent to regenerate) between separate fan modules of the DAC bank 238. When switching to power plant mode, one or more valves may iteratively close to keep the $CO_2$ flow directed only to the condenser fans instead of the DAC bank 238. As the amount of air scrubbed $CO_2$ falls, less and less power may be directed to the DAC bank 238, until DAC bank 238 is shut down. In some aspects, power to the DAC bank 238 may be stopped upon determining that the air scrubbing potential of the contactors falls below a predetermined threshold. As steady state power regeneration is achieved, power cycle heat loads may thereafter be ejected, and power previously utilized to power the contactor fans in the DAC bank 238 may be redirected to a power grid.

The exemplary switching process described above enables the system 100, 200 to operate during the "peaker" period of high electricity cost. More particularly, gas combined-cycle power plants and/or coal power plants may require a long startup period when turning on before they are ready to provide power to a power grid. As a result, fuel must be consumed for an extended period of time before any power can be provided to the power grid. This results in both additional $CO_2$ and other forms of pollution being emitted into the atmosphere by traditional power plants, as well as wasted fuel, e.g., coal, resources and thus money. Because renewable energy sources are able to produce power for the power grid at a lower cost compared to conventional gas or coal plants for the reasons described above, it may not be feasible for owners of conventional power plants to operate throughout the day. As a result, conventional power plants may need to turn off and then back on again, e.g., at the end of the day when renewable sources of power may not be available or may be available in lower quantities. The need to come on line for only part of the day, combined with the long startup period, may lead to wasted energy and resources, as well as excess pollution.

However, the system 100, 200 may address one or more of these shortcomings by providing an integrated power generation system and carbon capture system that is configured to function continuously, or for longer periods of time, either as a power plant for supplying a power grid or as a carbon sequestration system. By being able to operate continuously and switch between a power plant and carbon sequestration system, system 100, 200 may avoid or reduce the startup penalties in terms of emissions or life of the engine components experienced by traditional power plants, because the $CO_2$ cycle system components may continue to run even when not supplying power to the power grid, as it is just the load destination that changes. Systems of the present disclosure may thus conserve resources, reduce pollution, e.g., $CO_2$ emission, and offer a carbon negative way of generating power. Systems 100, 200 may achieve carbon negative power generation by using biomass as fuel and $CO_2$ as the working fluid, and the systems may function as even further carbon negative when the DAC system is incorporated.

While products of the systems described herein (e.g., heat, water, syngas, etc.) may be described as being reused within the system to promote efficiency of the system, reuse of products is not required.

The time period for facilitating the switching, at step 420, from the first operating mode to the second operating mode, or from the second operating mode to the first operating mode, at step 440, may vary. For example, in an embodiment, the computer controller system may cause the system 100, 200 to be switched between the operating modes in a first "regular" time period, e.g., in one hour or less. Alternatively, some situations may require the switching to be facilitated quicker (e.g., when a sudden load demand on the power grid is realized, when a power grid is about to become destabilized, etc.). In these situations, the system 100, 200 may undergo a "hard switch" from a carbon sequestration mode to a power supply mode in a matter of minutes. This type of hard switching, however, may result in a loss of captured $CO_2$ mid-process or at the expense of component long-term life.

At step 430, the computer control system may determine whether the predetermined condition is no longer satisfied. This determination may vary based on the type of predetermined condition, as described below.

In an embodiment, the predetermined condition may be considered to no longer be satisfied responsive to determining that the power grid operator has access to the other types of renewable energy. In an embodiment, this determination may be facilitated by receiving a second indication from the aforementioned timer or sensor. More particularly, just as the timer or sensor described above provided an indication to the computer control system to switch from the first operating mode to the second operating mode at a predetermined time, the timer or sensor may similarly provide a second indication to the computer control system to switch from the second operating mode to the first operating mode. The second indication may be received, for example, when a predetermined scheduled time has arrived. Similar to the first indication, the receipt of the second indication may be static (e.g., provided at the same time each day) or dynamic (e.g., provided at different times throughout the year based on context). Additionally or alternatively, in another embodiment, the determination may be facilitated by leveraging the historical sunlight data for the relevant geographic region to identify a sunrise time, which may be associated with a power grid operator's ability to receive another type of renewable energy, e.g., solar power. Additionally or alternatively, in another embodiment, the determination may be facilitated by leveraging the weather forecast data to identify whether the upcoming weather conditions may be favorable for the generation of certain types of renewable energy. For example, the weather forecast may indicate that the following day may be sunny or windy, which may be favorable for the generation of solar power or wind power, respectively.

In an embodiment, the predetermined condition may be considered to no longer be satisfied responsive to determining that the increased load previously required by the power grid is no longer needed. In an embodiment, this determination may be facilitated by identifying that the increased load has fallen or is expected to fall below the predetermined threshold. In some aspects, the computer control system may receive an indication from the power grid operator that there is or will no longer a need for additional power. Additionally or alternatively, the computer control system may anticipate when the power grid will no longer have a need for the additional power. For example, the computer control system may identify, from available schedule information, a designated conclusion time of a scheduled stress-producing event (e.g., concert, sporting event, festival, etc.). As another example, the computer control system may dynamically anticipate the conclusion of the scheduled stress-producing event based on access to historical context data (e.g., the computer control system may anticipate the conclusion of a concert based on knowledge of the runtime lengths of previous concert performances in general or previous performances of that specific performance, etc.). With respect to weather events that generate stress on the power grid, the computer control system may identify that the anticipated conclusion of the weather event may cause the stress on the power grid, and thus the need for additional power, to be removed. For example, upon conclusion of a heat wave, individuals may resume normal habits with respect to the operation of energy-consuming devices (e.g., individuals may no longer run their air conditioners or fans more than normal, etc.).

In an embodiment, the predetermined condition may be considered to no longer be satisfied responsive to determining that the power grid has been stabilized. In an embodiment, this determination may be facilitated by receiving an indication from the power grid operator that the failed assets that caused the grid destabilization have been repaired and/or are now operational again (e.g., other power providers contracted to provide power to the grid have renewed their ability to provide power to the grid, etc.). Additionally or alternatively, in another embodiment, the determination may be dynamically facilitated by anticipating a time period that a failed asset may be unavailable for based upon knowledge of the operational issue and/or weather, geological, and/or natural disaster event that caused the asset to be unavailable. For example, the computer control system may identify that a certain operational issue affecting a power plant may be remedied in an X time period, wherein the conclusion of the X time period may approximately correspond to grid stabilization. In another example, the computer control system may estimate, from weather and/or historical event data, an amount of time after the conclusion of an event that caused the asset to fail when the asset may be operational again.

In another embodiment, the predetermined condition may be considered no longer satisfied responsive to determining that the value projection for operation of the system 100, 200 in the second operating mode is lower than the value projection for operation of the system 100, 200 in the first operating mode. Stated differently, the predetermined condition may no longer be considered satisfied responsive to determining that operating the system 100, 200 in the second operating mode is less valuable to society, e.g., profitable, than operating the system 100, 200 in the first operating mode. In an embodiment, this determination may be facilitated by identifying that the projected value generated from sequestering and selling $CO_2$ is lower than the projected value for providing power to the grid (e.g., because a spot price to sell $CO_2$ has increased, etc.).

Responsive to determining, at step 430, that the predetermined condition remains satisfied, the system may, at step 435, maintain the system 100, 200 in the second operating mode. In an embodiment, the second operating mode may be maintained for as long as the predetermined condition remains satisfied. Alternatively, in another embodiment, the second operating mode may only be maintained for a predetermined period of time or until a predetermined amount of power has been provided to the power grid, irrespective of whether the predetermined condition remains satisfied.

Responsive to determining, at step 430, that the predetermined condition is no longer satisfied, the system 100, 200 may, at step 440, initiate switching of the operating mode from the second operating mode to the first operating mode. Method 400 may be repeated a plurality of times during operation of system 100, 200. This switching may enable the system 100, 200 to cycle back and forth between the two operating modes based upon the demands of a particular situation or based upon whatever is most advantageous to the system (e.g., value in terms of operating costs, revenue production, carbon capture, power generation, etc.).

Provided below are a plurality of alternative systems that may be used as system 100—in place of system 200—for performing carbon sequestration and power generation. Each of these alternative systems contains one or more variations to the components and/or process operations detailed in system 200 of FIG. 2, and may be used in a manner similar to or interchangeable with system 200 as described herein. For example, the systems of FIGS. 5, 6, and 7 may be used to perform the methods of FIG. 4 or as described above with respect to system 200. Furthermore, although portions of the systems described herein designate component origins and destinations from where heat may be removed and directed to, respectively, these are not necessarily limiting, and heat may be removed from components of any of the systems and/or from the produced syngas and directed to portions of the systems that require heat to function.

Figure 5:
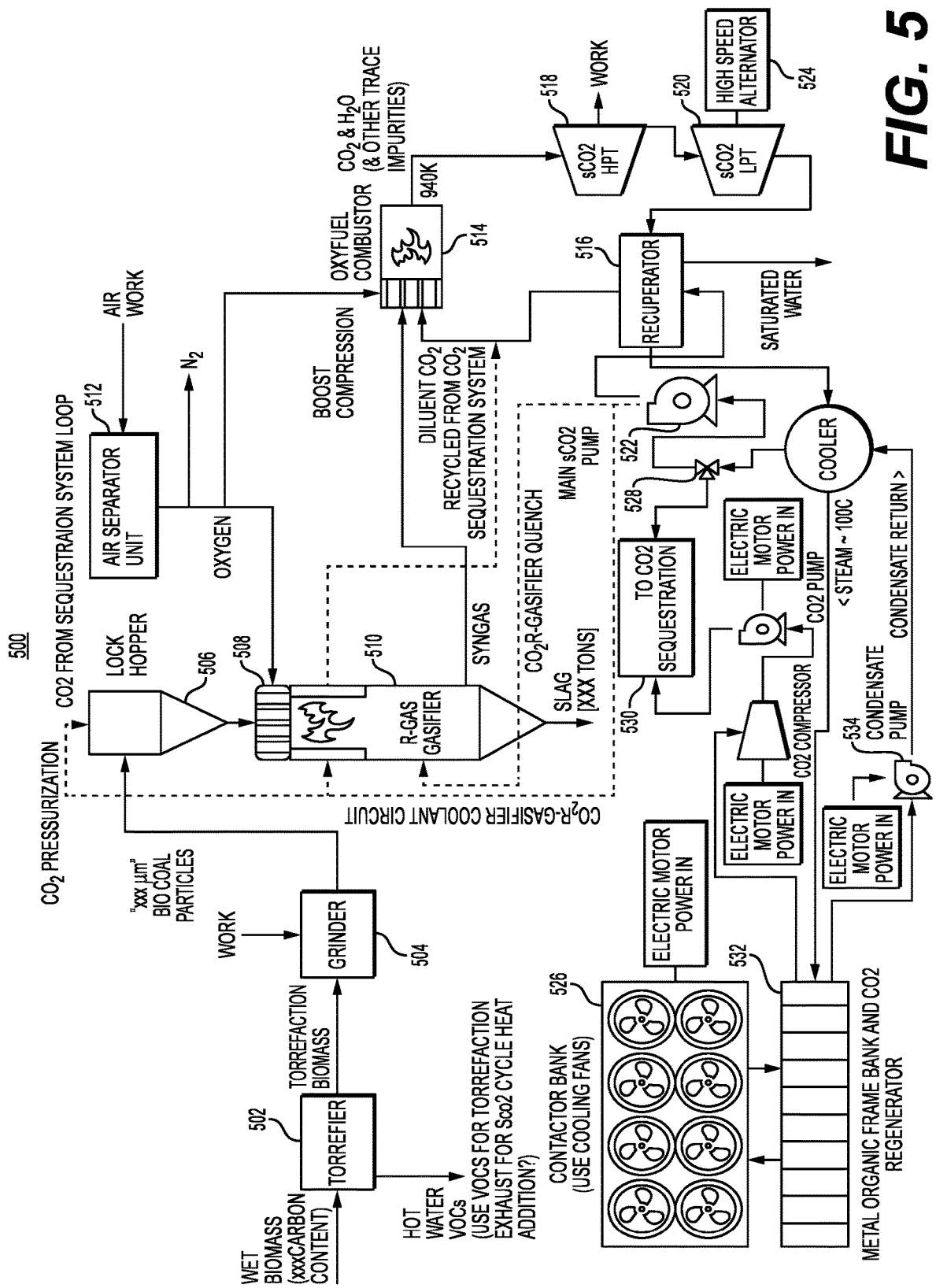
FIG. 5 depicts a schematic illustration of another exemplary integrated carbon sequestration and power generation system, according to various aspects of the present disclosure.

Referring now to FIG. 5, an exemplary integrated carbon sequestration and power generation system is 500 is depicted. System 500 may use biomass as fuel. As discussed in regards to systems 100 and 200 above, biomass refers to any carbon neutral or carbon negative fuel. For instance, potential types of biomass may include, e.g., wood products, such as wood processing wastes (e.g., firewood, wood pellets, wood chips, lumber and sawdust waste, etc.), agricultural products, including crops and waste materials (e.g., corn, soybeans, sugar cane, woody plants, algae, etc.), biogenic materials in municipal solid waste (e.g., paper, cotton, wool products, food, yard waste, etc.), non-biogenic materials in municipal solid waste (e.g., plastics or petroleum-based products), animal manure, or human sewage (e.g., bio waste discharge from water treatment plants). In an aspect, suitable biomass may be pre-processed by a torrefaction process, e.g., performed at a torrefaction reactor 502. In other aspects, however, pre-torrefied or otherwise pre-processed or unprocessed biomass may be received by system 500, and system 500 may not include a torrefaction reactor 502.

If incorporated into system 500, the torrefaction process may include drying the biomass and heating it in an oxygen deprived environment. Once the biomass reaches approximately 250-350 degrees C., the reaction becomes exothermic, and the products of the reaction include water, oxygen, nitrogen in the biomass, and VOCs. The VOCs may be burned to generate heat for drying and initiating the biomass reaction (which may be burned in pure oxygen or air).

In an aspect, the biomass may come out of the torrefaction reactor 502 (if included) easier to grind and containing other beneficial properties, such as increased carbon content density. This torrefied biomass may be fed into a grinding system 504, which may be configured to prepare the biomass for pressurization and conveyance, e.g., via a lock hopper 506, into an injector 508 that subsequently conveys the ground, torrefied biomass into a gasifier 510, where the biomass is partially oxidized to separate it into its constituents, e.g., using oxygen at least obtained from an air separator unit 512. The $CO_2$ may then be pressurized. In an embodiment, the main gaseous products of the foregoing reactions include hydrogen ($H_2$), carbon monoxide (CO), and carbon dioxide ($CO_2$), along with trace amounts of species formed due to trace elements in the biomass. The solid products that cannot be gasified in the reaction may be collected at the bottom of the gasifier 510 as molten slag, which may include solid elements and compounds within plant biomass, such as potassium, amongst others.

In an aspect, after the syngas is formed, it may be quenched down to usable temperatures. Such a process may be facilitated by introducing water or $CO_2$ from the main cycle into the gasifier 510, which may allow for the formation of non-liquid ashes on the condensable species. The water may be removed after the syngas is out of the reactor, while the $CO_2$ may be kept in the stream for oxyfuel combustion purposes and expanding in the turbine system downstream. In a fully pressurized system, the foregoing water removal step may not be needed. Once the syngas leaves the gasifier reactor vessel 510, it may be processed with one or more scrubbers, candle filters, and/or other available gas processing systems in order to produce a clean syngas that is clean burning and will not negatively affect the machinery downstream of the main combustion system. Thereafter, the syngas may then be fully oxidized (e.g., with an oxygen stream derived from an air separation unit 512) in the main combustion system (e.g., oxyfuel combustor 514), thereby creating a stream of mostly water and $CO_2$. This stream may be combined with a recirculated stream of mostly $CO_2$ that has passed through a recuperator 516, being preheated to an amenable temperature for the cycle to have acceptable thermodynamic efficiency. The combustion stream may be diluted and may then be expanded in a first turbine stage (e.g., a high-pressure turbine 518) that powers the main cycle recirculation pump 522. After the flow of $CO_2$ goes through that turbine expansion, it may be injected into another set of turbine stages (e.g., a low-pressure turbine 520) to fully expand to its lowest pressure level in the cycle. This may provide the power to the generator/alternator 524 that is attached mechanically to the system.

In an aspect, once the combined recirculation and combustion streams are expanded, they may be passed through one or more heat exchanger(s) (e.g., the heat exchanger(s) located in the "recuperator" section, e.g., 516). This may allow the stream to exchange heat with the high-pressure cycle pump 522 discharge, thereby heating the pump discharge as it is directed to the main combustor system 514. The $CO_2$ flow stream coming from the turbine loses most of its water in the heat exchanger system. It is then directed to a cooling bank 526 to remove the rest of the heat in order to return the flow to close to ambient temperature before siphoning the amount of $CO_2$ that was created in the combustion process through a 3-way valve 528 or other suitable mechanism. This $CO_2$ stream may then be inserted into a pipeline, e.g., for transport to an underground storage location, such as a well, at 530. In other aspects, the $CO_2$ may be liquefied for transport via a highway into a well.

In an embodiment, the cooling bank system 526 may reject heat at a given temperature that is amenable to use in direct air carbon sequestration sorbent regeneration. The cooling bank system may be interconnected with a bank of sorbent materials 532, which may be solid sorbent materials (e.g., Metal Organic Frameworks (MOFs), zeolites, silica, activated carbon, etc.), and/or liquid sorbent materials containing aqueous inorganic bases or aqueous organic amines, etc., that are capable of effectively adsorbing or absorbing and storing atmospheric $CO_2$, and which have a low temperature or high energy requirement for $CO_2$ regeneration. The stream of $CO_2$ may be used to heat the sorbent material bank in order to regenerate the system once it captures $CO_2$ from the atmosphere via a series of fans configured to cool the sorbent system and allow it to come into contact with air, thereby trapping its $CO_2$ in a charge cycle. The material may discharge via using waste heat from the $CO_2$ power system. The fan and the compression train for the collected $CO_2$ may use energy in the form of electric power from the turbo expander. The condensate discharged from the sorbent materials may be provided to a pump 534 and returned, via passage through the 3-way valve 528 or other suitable device, back to the high-pressure cycle pump 522, from which it may be pressured, provided to recuperator 516, and provided to the oxyfuel combustor 514 as a recirculation stream.

Referring now to FIG. 6, an exemplary carbon sequestration and power generation system 600 is depicted that is configured for high temperature heat recovery. In an aspect, the components and process flow in system 600 may be substantially equivalent to system 200 downstream from the oxyfuel combustor. However, system 600 may contain two heat exchangers located in the syngas line. The first heat exchanger may be a high temperature heat exchanger positioned upstream of the scrubber, which may be configured to heat the syngas after it has been conditioned from the gasifier. This heating process may be used to increase heat input into the $CO_2$ cycle (such as a supercritical $CO_2$ cycle), e.g., via a discharge stream from this first heat exchanger to the main combustor. The first high temperature heat exchanger located upstream of the scrubber may allow for the delivery of high-quality heat to the topping end of the cycle 600. The second heat exchanger may be a low temperature heat exchanger positioned downstream of the scrubber, which may be configured to remove the water in the syngas due to the quench. This process may allow steam to be generated and used for DAC capture low temperature sorbent regeneration. In an aspect, the heat removed from the first and second heat exchangers may be redirected to other components of the system 600 according to electrical or carbon sequestration energy needs.

In system 600, biomass (e.g., any carbon neutral or carbon negative fuel (such as agricultural products or waste, wood, trees, or underbrush cleared from forests, other organic waste, other municipal waste, any combination of the foregoing, and the like, as described above) may be provided from a biomass conveyance system 602 to a feed hopper 604, which may be configured to convey the biomass into gasifier 606, e.g., at a predetermined controlled feed rate.

Any suitable type of gasifier 606 may be utilized in the system 600, e.g., a fixed-bed gasifier, an entrained-flow gasifier, a fluidized-bed gasifier, or other suitable gasifier types. The biomass provided to the gasifier 606 may be reacted with oxygen ($O_2$) and injected steam in a gasification reaction. In an embodiment, the oxygen may be provided to gasifier 606 from an air separation unit 608 via, e.g., pump 610. The air separation unit 608 may, for example, leverage vacuum pressure swing absorption (VPSA) or temperature swing adsorption (TSA) technology to separate air into its constituent components. In another embodiment, the oxygen may be obtained from a cryogenic oxygen separator. In another embodiment, the air separation unit 608 may be a cryogenic system. In yet another embodiment, the oxygen may be obtained from a dedicated oxygen delivery service or pipeline. In an embodiment, the injected steam may be derived from syngas condensate and may be provided to gasifier 606 from a "second" heat exchanger, e.g., a low temperature heat exchanger 612 via pump 614, as further described herein. The product of the foregoing reaction is a syngas mixture containing gaseous hydrogen ($H_2$), carbon monoxide (CO), and $CO_2$, along with trace amounts of species formed as a result of trace elements in the biomass. The solid products that cannot be gasified in the reaction are collected at the bottom of the gasifier 606 as molten slag and ash (e.g., fly ash, bottom ash, etc.).

Syngas formed through the gasification reaction may then be passed to a "first" heat exchanger, e.g., a high temperature heat exchanger 616, which may be configured to heat the syngas. This heated syngas may be passed to a scrubber 618 that is configured to process the syngas in order to remove water from the syngas stream and/or other ash particulates and halides in order to produce a syngas that is clean burning and will not negatively affect the machinery downstream of the main combustion system.

After exiting the scrubber 618, the cleaned syngas may pass through the low temperature heat exchanger 612. The low temperature heat exchanger 612 may be configured to remove the water in the syngas due to the quench. The syngas may be sent to pump 614 to be reinjected in gasifier 606. With the energy of condensation, this process thus may create steam to be used for DAC capture low temperature sorbent regeneration and/or to be used for steam injection into the gasifier 606.

After exiting the low temperature heat exchanger 612, the syngas stream may be compressed to full pressure, if needed by, for example, a syngas boost compressor 620. After being compressed, the pressured syngas may be directed back to the high temperature heat exchanger 616, heated, and then subsequently utilized to increase heat input into the $CO_2$ cycle (such as a supercritical $CO_2$ cycle), e.g., via a discharge stream from the high temperature heat exchanger 616 to a combustor 622.

In an embodiment, the combustor 622 may be a bio syngas oxy combustor. The syngas provided to the combustor 622 may be fully oxidized (e.g., with an oxygen stream derived from the air separation unit 608 and compressed via an oxygen boost compressor 624), thereby creating a stream of mostly water and $CO_2$. The stream resultant from the oxidation reaction between the syngas and oxygen stream may be combined in the combustor 622 with a recirculated stream of mostly $CO_2$. The recirculated stream of $CO_2$ may have been passed through a recuperator heat exchanger 626 to preheat it to an amenable temperature for the cycle to have acceptable thermodynamic efficiency (e.g., a thermodynamic efficiency that ensures that power is left to run all the supplemental power requirements of system 600).

In an embodiment, the combustion stream exiting the combustor 622 may be expanded in one or more turbines, e.g., a first turbine 628 (e.g., a high pressure turbine). The high pressure turbine 628 may be a direct fired turbine and may be designed to efficiently extract work out of the high pressure combustion stream, which may thereafter be utilized to power the main cycle recirculation pump 630. The turbine exhaust from the high pressure turbine 628 may be directed to a second turbine 632 (e.g., a low pressure turbine). The low pressure turbine expansion may provide power to a generator 634 (i.e., a turbo alternator) that may be attached mechanically to a rotor of the low pressure turbine 632 and to a low/intermediate pressure compressor 636.

Energy generated by the generator 634 may be utilized in a variety of different ways based on the operating mode of the system 600. For instance, in a first operating mode, the system 600 may behave as a power plant, and the power generated by the generator 634 may be output from the system 600. In a second operating mode, the system 600 may behave as a $CO_2$ capture system, and the power generated by the generator 634 may be utilized to provide power to components of a DAC system (e.g., air-contacting fans and compressors). In a third operating mode, the system 600 may be configured to distribute the power from the generator 634 to both the power grid and to the DAC system.

The low pressure turbine discharge stream may then be passed to the recuperator heat exchanger 626. The recirculating $CO_2$ stream from the high-pressure recirculation pump 630 may also be introduced to recuperator heat exchanger 626. This allows the low pressure turbine discharge stream to exchange heat with the recirculating $CO_2$ stream pump from the high-pressure recirculation pump 630, thereby heating the recirculating $CO_2$ stream as it is directed to the main combustor 622 and cooling the second turbine discharge stream as it is being directed to a DAC fan bank 638. In various embodiments, heat in the $CO_2$ stream having passed through recuperator heat exchanger 626 may be used to boil water at the low temperature range of recuperator heat exchanger 626.

The cooled second turbine discharge stream may be directed to pass through the DAC fan bank 638. The DAC fan bank 638 may be configured to reject heat at a given temperature that is amenable to use in direct air carbon sequestration sorbent regeneration. The cooling bank system may be interconnected with a bank of sorbent materials, which may be solid sorbent materials (e.g., Metal Organic Frameworks (MOFs), zeolites, silica, activated carbon, etc.), and/or liquid sorbent materials containing aqueous inorganic bases or aqueous organic amines, etc., that are capable of effectively adsorbing or absorbing and storing atmospheric $CO_2$, and which have a low temperature or high energy requirement for $CO_2$ regeneration. For the discharge cycle, the cooled second turbine discharge stream may be used to heat the sorbent material in the DAC bank 638 (e.g., via conduction). This preheats the sorbent material to allow it to accept the steam from the syngas heat rejected by the low temperature heat exchanger 612. This steam may be used to remove the $CO_2$ gas from the sorbent materials.

The freed $CO_2$-containing stream is passed through a condenser 640, in which water in the freed $CO_2$-containing stream is removed and pumped, via pump 642, back to the low temperature heat exchanger 612 to be utilized in a continuous loop. The $CO_2$ stream formed by the $CO_2$ released from the sorbent may then be compressed in a $CO_2$ compressor 644 and sent to a pipeline via valve 646 or other suitable flow control mechanism. In one embodiment, the pipeline may transport the sequestered $CO_2$ to a designated underground storage location. For example, the $CO_2$ may be transported to a well 248, which may be a class VI well. In another embodiment, the pipeline may transport the sequestered $CO_2$, e.g., to one or more other contracting entities.

In an embodiment, after passage through the direct air capture bank 638, the cooled $CO_2$ stream may then be transported to a low/intermediate pressure compressor 636 to go through the critical point to form, in some embodiments, $sCO_2$ before being injected into the high pressure recirculation pump 630, configured to increase the pressure of the $CO_2$ stream to combustion injection pressures. In an embodiment, one or both of the cooled $CO_2$ stream exiting the DAC bank 638 and the compressed $CO_2$ stream exiting the low/intermediate pressure compressor 636 may be cooled by another cooler 650 to increase efficiency. The recirculating pump discharge stream may then be heated via passage through the recuperator heat exchanger 626 and then recycled back into the combustor 622. In an embodiment, the $CO_2$ that was created in the combustion process may be siphoned through a 3-way valve or other suitable flow control mechanism (e.g., an orifice plate configured to throttle the amount being rejected, or via leakage passages inside the main pump flow region, etc.) at a pressure that is ready for pipeline injection or liquefied transport through highway into the well 648 (as directed, e.g., by valve 652 or other suitable flow control mechanism).

Figure 7:
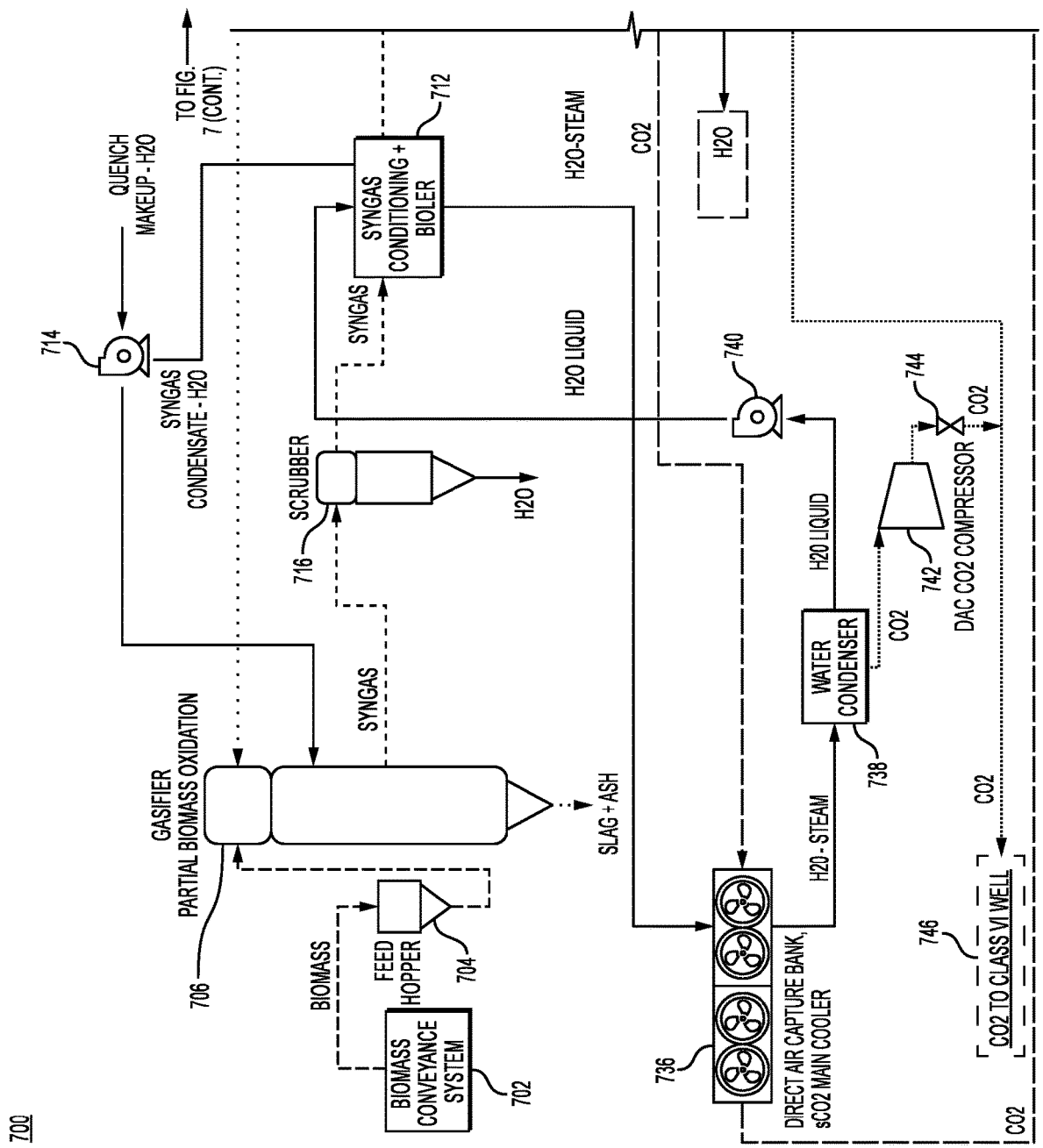
FIG. 7 depicts a schematic illustration of another exemplary integrated carbon sequestration and power generation system, according to various aspects of the present disclosure.
Figure 7:
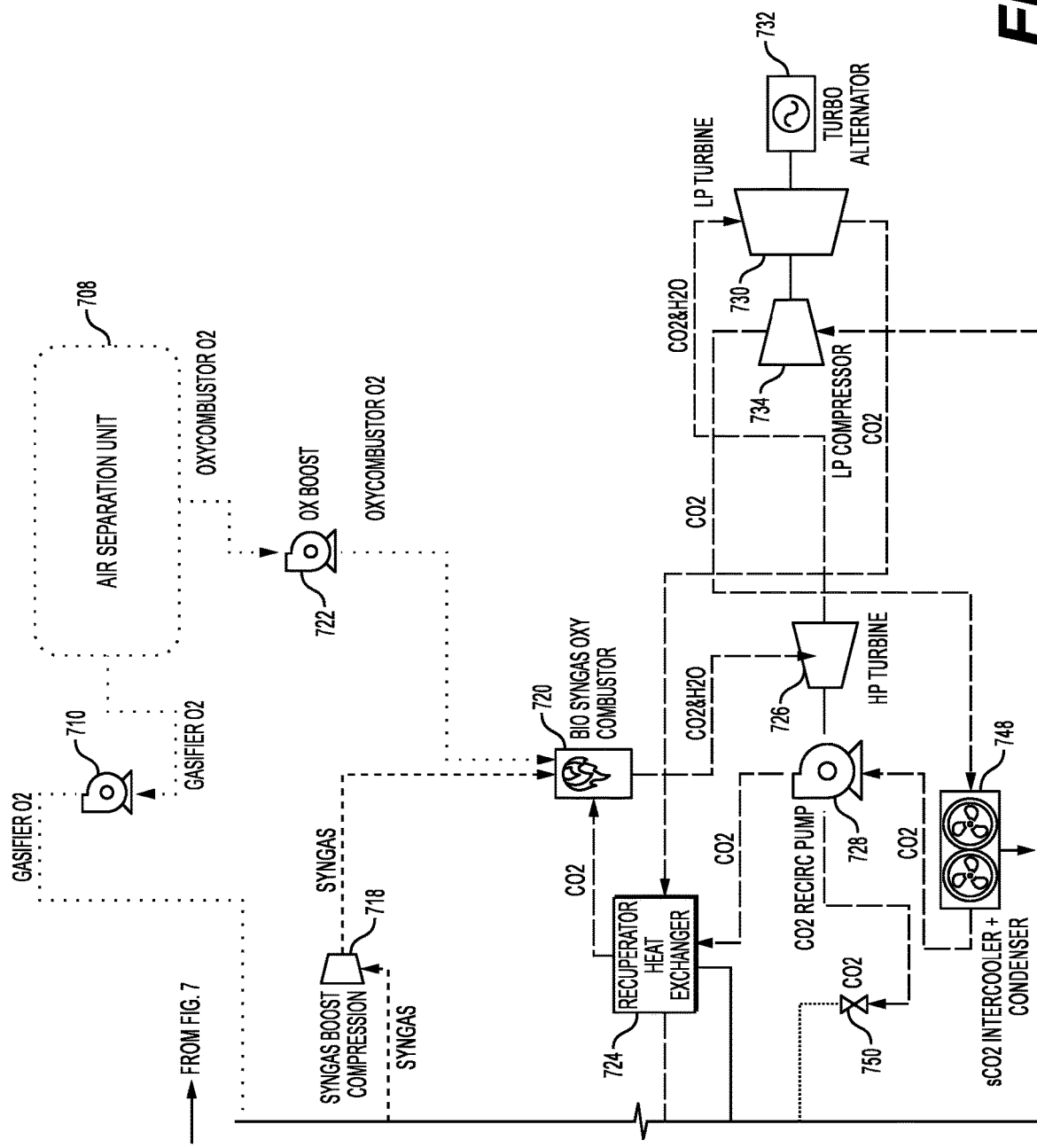

Referring now to FIG. 7, an exemplary carbon sequestration and power generation system 700 is depicted that is configured for low temperature heat recovery. In this configuration, only one heat exchanger is provided after the scrubber, which is configured to remove the syngas heat to generate steam to be used for DAC capture low temperature sorbent regeneration. This may facilitate or maximize DAC capture capacity.

In system 700, biomass (e.g., any carbon neutral or carbon negative fuel (such as agricultural products or waste, wood, trees, or underbrush cleared from forests, other organic waste, other municipal waste, any combination of the foregoing, and the like) may be provided from a biomass conveyance system 702 to a feed hopper 704, which may be configured to convey the biomass into gasifier 706, e.g., at a predetermined controlled feed rate.

Any suitable type of gasifier 706 may be utilized in the system 700, e.g., a fixed-bed gasifier, an entrained-flow gasifier, a fluidized-bed gasifier, or other suitable gasifier types. The biomass provided to the gasifier 706 may be reacted with oxygen ($O_2$) and injected steam in a gasification reaction. In an embodiment, the oxygen may be provided to gasifier 706 from an air separation unit 708 via pump 710. The air separation unit 708 may, for example, leverage vacuum pressure swing absorption (VPSA) or temperature swing adsorption (TSA) technology to separate air into its constituent components. In another embodiment, the oxygen may be obtained from a cryogenic oxygen separator. In another embodiment, the air separation unit 708 may be a cryogenic oxygen system. In yet another embodiment, the oxygen may be obtained from a dedicated oxygen delivery service or pipeline. In an embodiment, the injected steam may be derived from syngas condensate and may be provided to gasifier 706 from a low temperature heat exchanger 712 via pump 714, as further described herein. The product of the foregoing reaction is a syngas mixture containing gaseous hydrogen ($H_2$), carbon monoxide (CO), and $CO_2$, along with trace amounts of species formed as a result of trace elements in the biomass. The solid products that cannot be gasified in the reaction are collected at the bottom of the gasifier 706 as molten slag and ash (e.g., fly ash, bottom ash, etc.).

Syngas formed through the gasification reaction may then be passed to a scrubber 716 that is configured to process the syngas in order to remove water from the syngas stream and/or other ash particulates and halides in order to produce a syngas that is clean burning and will not negatively affect the machinery downstream of the main combustion system.

After exiting the scrubber 716, the cleaned syngas may pass through the low temperature heat exchanger 712. The low temperature heat exchanger 712 may be configured to remove the water in the syngas due to the quench. The syngas may be sent to pump 714 to be reinjected in gasifier 706. With the energy of condensation, this process thus may create steam to be used for DAC capture low temperature sorbent regeneration and/or to be used for steam injection into the gasifier 706.

After exiting the low temperature heat exchanger 712, the syngas stream may be compressed to full pressure, if needed by, for example, a syngas boost compressor 718. After being compressed, the pressured syngas may be introduced into a combustor 720.

In an embodiment, the combustor 720 may be a bio syngas oxy combustor. The syngas provided to the combustor 720 may be fully oxidized (e.g., with an oxygen stream derived from the air separation unit 708 and compressed via an oxygen boost compressor 722), thereby creating a stream of mostly water and $CO_2$. The stream resultant from the oxidation reaction between the syngas and oxygen stream may be combined in the combustor 720 with a recirculated stream of mostly $CO_2$. The recirculated stream of $CO_2$ may have been passed through a recuperator heat exchanger 724 to preheat it to an amenable temperature for the cycle to have acceptable thermodynamic efficiency (e.g., a thermodynamic efficiency that ensures that power is left to run all the supplemental power requirements of system 700).

In an embodiment, the combustion stream exiting the combustor 720 may be expanded in one or more turbines, e.g., a first turbine 726 (e.g., a high pressure turbine). The high pressure turbine 726 may be a direct fired turbine and may be designed to efficiently extract work out of the high pressure combustion stream, which may thereafter be utilized to power the main cycle recirculation pump 728. The turbine exhaust from the high pressure turbine 726 may be directed to a second turbine 730 (e.g., a low pressure turbine). The low pressure turbine expansion may provide power to a generator 732 (e.g., a turbo alternator) that may be attached mechanically to a rotor of the low pressure turbine 730 and to a low/intermediate pressure compressor 734.

Energy generated by the generator 732 may be utilized in a variety of different ways based on the operating mode of the system 700. For instance, in a first operating mode, the system 700 may behave as a power plant, and the power generated by the generator 732 may be output from the system 700. In a second operating mode, the system 700 may behave as a $CO_2$ capture system, and the power generated by the generator 732 may be utilized to provide power to components of a DAC system (e.g., air-contacting fans and compressors). In a third operating mode, the system 700 may be configured to distribute the power from the generator 732 to both the power grid and to the DAC system.

The low pressure turbine discharge stream may then be passed to the recuperator heat exchanger 724. The recirculating $CO_2$ stream from the high-pressure recirculation pump 728 may also be introduced to recuperator heat exchanger 724. This allows the low pressure turbine discharge stream to exchange heat with the recirculating $CO_2$ stream pump from the high-pressure recirculation pump 728, thereby heating the recirculating $CO_2$ stream as it is directed to the main combustor 720 and cooling the second turbine discharge stream as it is being directed to a DAC fan bank 736. In various embodiments, heat in the $CO_2$ stream having passed through recuperator heat exchanger 724 may be used to boil water at the low temperature range of recuperator heat exchanger 724.

The cooled second turbine discharge stream may be directed to pass through the DAC fan bank 736. The DAC fan bank 736 may be configured to reject heat at a given temperature that is amenable to use in direct air carbon sequestration sorbent regeneration. The cooling bank system may be interconnected with a bank of sorbent materials, which may be solid sorbent materials (e.g., Metal Organic Frameworks (MOFs), zeolites, silica, activated carbon, etc.), and/or liquid sorbent materials containing aqueous inorganic bases or aqueous organic amines, etc., that are capable of effectively adsorbing or absorbing and storing atmospheric $CO_2$, and which have a low temperature or high energy requirement for $CO_2$ regeneration. For the discharge cycle, the cooled second turbine discharge stream may be used to heat the sorbent material in the DAC bank 736 (e.g., via conduction). This preheats the sorbent material to allow it to accept the steam from the syngas heat rejected by the low temperature heat exchanger 712. This steam may be used to remove the $CO_2$ gas from the sorbent materials.

The freed $CO_2$-containing stream is passed through a condenser 738, in which water in the freed $CO_2$-containing stream is removed and pumped, via pump 740, back to the low temperature heat exchanger 712 to be utilized in a continuous loop. The $CO_2$ stream formed by the $CO_2$ released from the sorbent may then be compressed in a $CO_2$ compressor 742 and sent to a pipeline via valve 744 or other suitable flow control mechanism. In one embodiment, the pipeline may transport the sequestered $CO_2$ to a designated underground storage location. For example, the $CO_2$ may be transported to a well 746, which may be a class VI well. In another embodiment, the pipeline may transport the sequestered $CO_2$, e.g., to one or more other contracting entities.

In an embodiment, after passage through the direct air capture bank 736, the cooled $CO_2$ stream may then be transported to a low/intermediate pressure compressor 734 to go through the critical point to form, in some embodiments, $sCO_2$ before being injected into the high pressure recirculation pump 728, configured to increase the pressure of the $CO_2$ stream to combustion injection pressures. In an embodiment, one or both of the cooled $CO_2$ stream exiting the DAC bank 736 and the compressed $CO_2$ stream exiting the low/intermediate pressure compressor 734 may be cooled by another cooler 748 to increase efficiency. The recirculating pump discharge stream may then be heated via passage through the recuperator heat exchanger 724 and then recycled back into the combustor 720. In an embodiment, the $CO_2$ that was created in the combustion process may be siphoned through a 3-way valve or other suitable flow control mechanism (e.g., an orifice plate configured to throttle the amount being rejected, or via leakage passages inside the main pump flow region, etc.) at a pressure that is ready for pipeline injection or liquefied transport through highway into the well 746 (as directed, e.g., by valve 750 or other suitable flow control mechanism).

As described above, exemplary integrated carbon sequestration and power generation systems described herein may incorporate a Rankine cycle as the thermodynamic power cycle 110 (FIG. 1). A typical Rankine cycle may have backpressure well below ambient pressure so the temperature of condensing water is close to room temperature to promote efficiency of the system. There is a large amount of heat released due to condensation of water. The pressure of such systems tends to be approximately 0.1 bar, as that puts the saturation temperature close to normal ambient temperature.

Embodiments of the present disclosure that include a Rankine cycle as the thermodynamic power cycle may alter the backpressure of a steam turbine in the integrated carbon sequestration and power generation system to a value of approximately 0.5 bar to approximately 1.0 bar, e.g., of approximately 1 bar. At approximately 1 bar, the saturation temperature is 100 degrees Celsius, and there will be constant temperature heat rejection until all steam has condensed to water. As a result, maintaining the backpressure of a steam turbine at approximately 1 bar may have the benefit that sorbent in the DAC portion of the integrated system being regenerated will get to that temperature of 100 degrees Celsius. In this way, for some exemplary systems of the disclosure, the backpressure of a steam turbine may be chosen to target the temperature required for the sorbent, and steam may be bypassed around a secondary steam turbine so the amount of electrical power and thermal power is matched to what the DAC system requires. For example, a first portion of steam that has gone through a first steam turbine may be utilized to regenerate the sorbent of the integrated DAC system, and a second portion of steam (e.g., the remaining steam) may continue through a second steam turbine down to the normal Rankine backpressure. These two streams may come together after a pump brings the condensed 0.1 bar water back up to pressure.

Figure 8A:
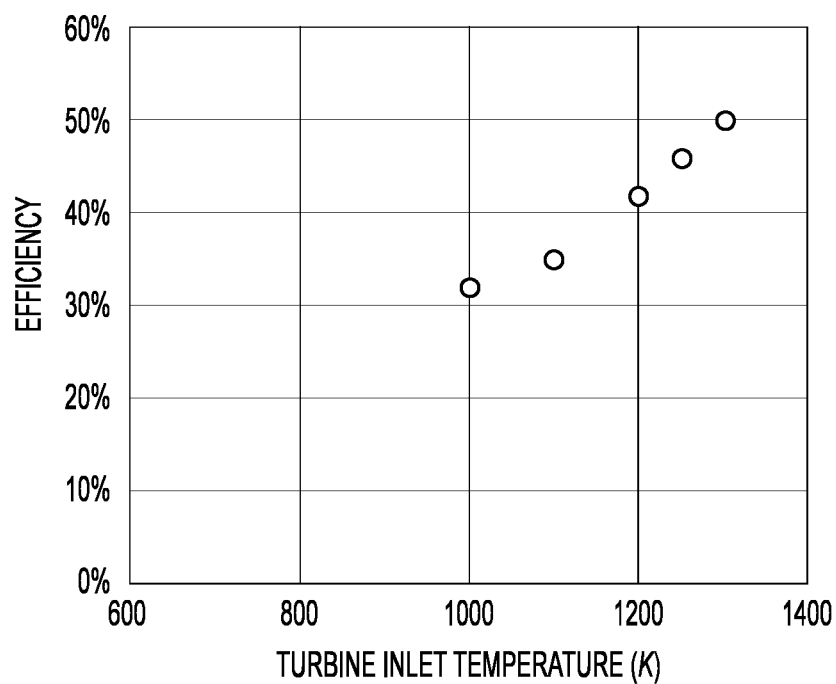
FIGS. 8A and 8B depict plot diagrams illustrating cycle efficiency of the power system, without including parasitic losses, according to various aspects of the present disclosure.
Figure 8B:
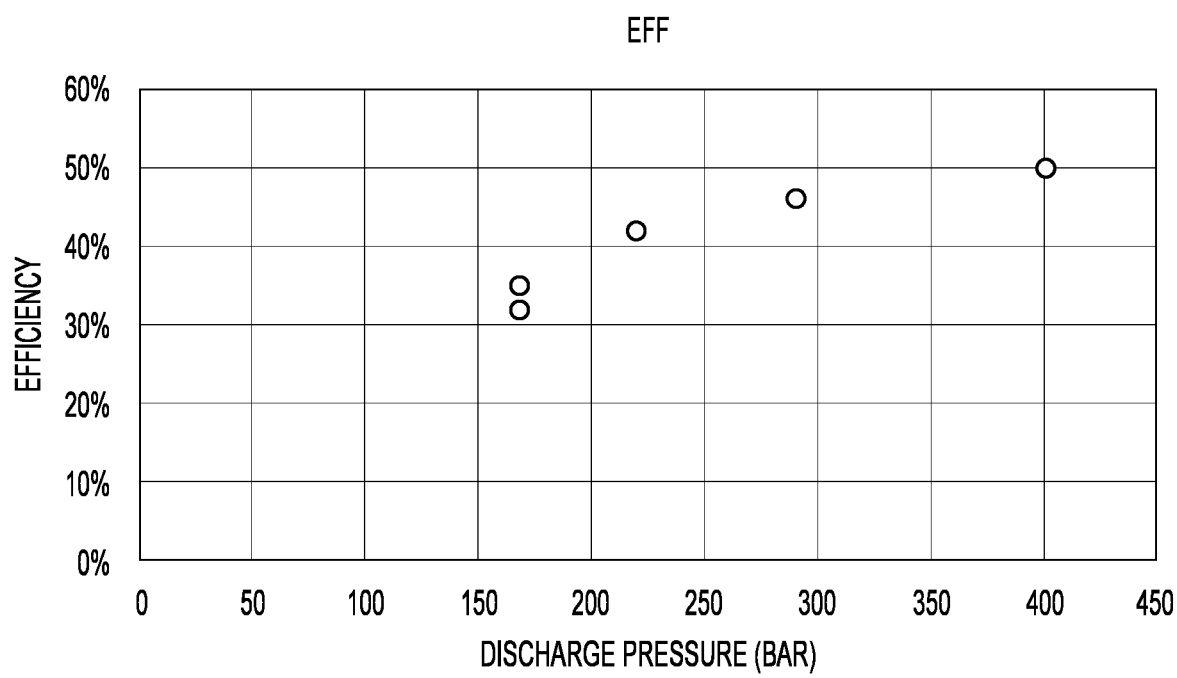

Referring now collectively to FIGS. 8A and 8B and Table 2 above, plot diagrams are provided for illustrating the benefits of the pressure and temperature ranges described herein. One potential benefit of the system embodiments described herein is that the output power in the cycles occurring in systems 100, 200, 500, 600 and 700 may be adjusted while maintaining the turbomachinery "on-design" by adjusting the pressures on the flow. For example, if the output power of a system needs to be reduced, $CO_2$ may be bled out from the system faster, correspondingly resulting in a drop of pressure. As an example of the foregoing, if $CO_2$ is removed so that the low pressure compressor suction pressure is approximately 20 bar, then the high pressure compressor discharge would be approximately 96 bar, resulting in an approximately 40% reduction in power generation. The foregoing abilities enable flexibility with respect to gasification output, power demands, etc.

Furthermore, as the temperature of the system is increased, the pressure also correspondingly needs to be increased in order to maintain the temperature on the recuperator. This may provide for higher efficiency while using fundamentally the same cycle. For example, in this case, if the low end pressure is held at approximately 35 bar, but a variant was desired that operated at a higher efficiency, compression could be increased and subsequently the temperature could also be increased. As a result, in embodiments of the disclosure described herein, increasing the discharge pressure and the combustor temperature may boost efficiency but the cycle is generally equivalent.

In general, any process discussed in this disclosure that is computer-implementable may be performed manually or by one or more processors of a computer system. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer server. A processor may be a central processing unit (CPU), a graphics processing unit (GPU), or any suitable types of processing unit.

A computer system, such as a computer control system associated with any of systems 100, 200, 500, 600, and 700 may include one or more computing devices. If the one or more processors of the computer system are implemented as a plurality of processors, the plurality of processors may be included in a single computing device or distributed among a plurality of computing devices. If a system environment comprises a plurality of computing devices, the memory of the computer system may include the respective memory of each computing device of the plurality of computing devices.

Figure 9:
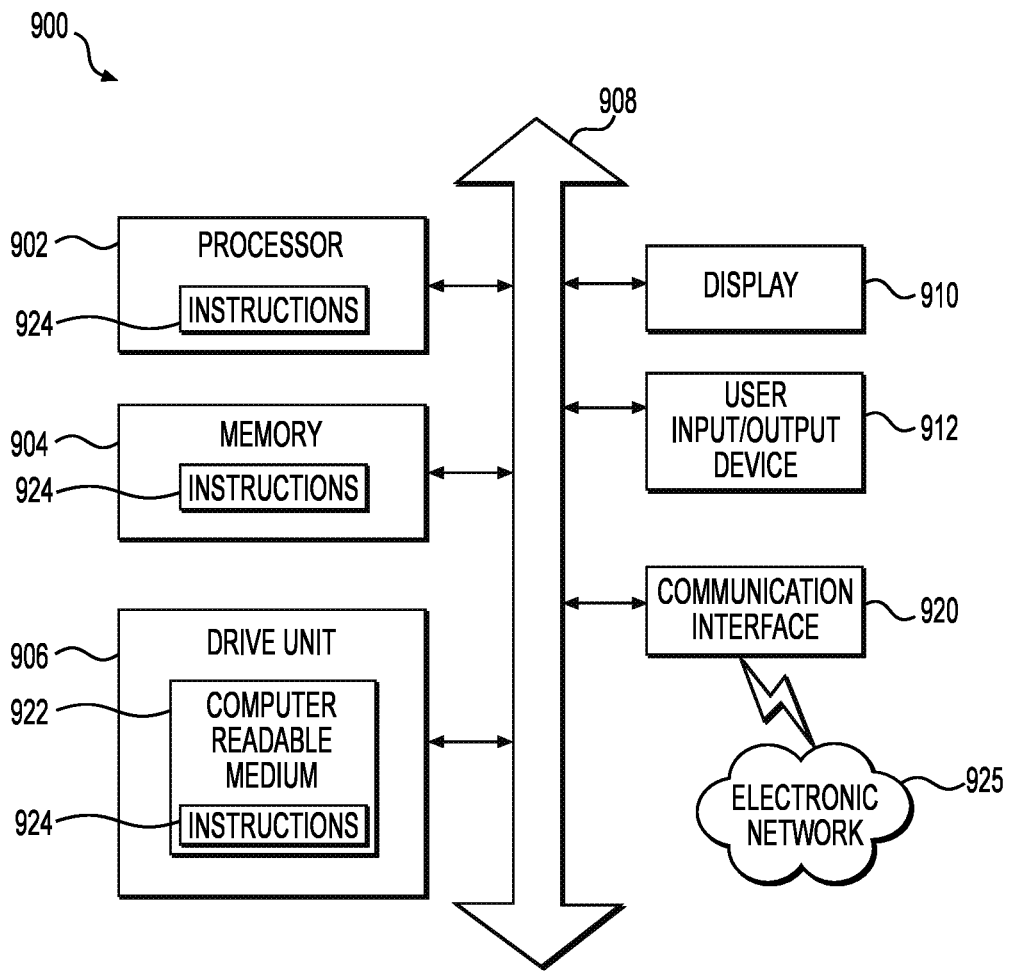
FIG. 9 depicts an exemplary computing system, according to various aspects of the present disclosure.

FIG. 9 is a simplified functional block diagram of a computer system 900 that may be configured as a computing device for executing the process illustrated in FIG. 4 and/or that may be compatible with any of systems 100, 200, 500, 600, and 700, according to exemplary embodiments of the present disclosure. FIG. 9 is a simplified functional block diagram of a computer that may be configured as according to exemplary embodiments of the present disclosure. In various embodiments, any of the systems herein may be an assembly of hardware including, for example, a data communication interface 920 for packet data communication. The platform also may include a central processing unit ("CPU") 902, in the form of one or more processors, for executing program instructions. The platform may include an internal communication bus 908, and a storage unit 906 (such as ROM, HDD, SDD, etc.) that may store data on a computer readable medium 922, although the system 900 may receive programming and data via network communications via electronic network 925 (e.g., voice, video, audio, images, or any other data over the electronic network 925).

The system 900 may also have a memory 904 (such as RAM) storing instructions 924 for executing techniques presented herein, although the instructions 924 may be stored temporarily or permanently within other modules of system 900 (e.g., processor 902 and/or computer readable medium 922). The system 900 also may include input and output ports 912 and/or a display 910 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

While various implementations of the disclosure have been described, it will be apparent to those of ordinary skill in the art that many more implementations are possible within the scope of the disclosure. Accordingly, the disclosure is not to be restricted except in light of the attached claims and their equivalents.

We claim:

1. An integrated carbon sequestration and power generation system, comprising:
    a thermodynamic cycle configured to receive biomass and to generate heat and power; and
    a direct air capture (DAC) carbon sequestration system configured to receive at least some of the heat and at least some of the power generated by the thermodynamic cycle to facilitate carbon sequestration;
    wherein the integrated carbon sequestration and power generation system is configured to provide at least some of the power produced by the thermodynamic cycle to a power grid that is separate from the integrated carbon sequestration and power generation system;
    wherein the integrated carbon sequestration and power generation system is configured to switch between a first operating mode, in which at least some of the power produced by the thermodynamic cycle is used to power the DAC carbon sequestration system, and a second operating mode, in which at least some of the power produced by the thermodynamic cycle is provided to the power grid;
    wherein the integrated carbon sequestration and power generation system is configured to switch between the first operating mode and the second operating mode based at least in part on whether a predetermined condition is determined to be satisfied;
    wherein the determining whether the predetermined condition is satisfied comprises determining whether a threshold number or type of power sources associated with the power grid are available.

2. The integrated carbon sequestration and power generation system of claim 1, wherein the biomass includes at least one of: plant matter or municipal waste.

3. The integrated carbon sequestration and power generation system of claim 1, wherein sorbent material of the DAC carbon sequestration system includes a solid sorbent or a liquid sorbent configured to adsorb carbon dioxide ($CO_2$).

4. The integrated carbon sequestration and power generation system of claim 3, wherein at least some of the heat produced by the thermodynamic cycle is utilized to regenerate the sorbent material after carbon capture.

5. The integrated carbon sequestration and power generation system of claim 1, wherein at least one of a sensor or a timer is used to determine whether the predetermined condition is satisfied.

6. The integrated carbon sequestration and power generation system of claim 1, wherein the determining whether the predetermined condition is satisfied further comprises receiving information from a power grid operator that the predetermined condition is satisfied.

7. The integrated carbon sequestration and power generation system of claim 1, wherein the determining whether the predetermined condition is satisfied further comprises determining whether an increased load is required by the power grid.

8. The integrated carbon sequestration and power generation system of claim 1, wherein the determining whether the predetermined condition is satisfied further comprises determining whether a first projected value derived from operation of the integrated carbon sequestration and power generation system in the first operating mode is greater or less than a second projected value derived from operation of the integrated carbon sequestration and power generation system in the second operating mode.

9. The integrated carbon sequestration and power generation system of claim 1, wherein the power generation system includes at least one of a Brayton cycle, a recuperated Brayton cycle, or a Rankine cycle.

10. An integrated carbon sequestration and power generation system, comprising:
   a gasifier configured to receive a biomass and configured to produce a syngas;
   a combustor configured to produce a combustion stream from the cleaned syngas, oxygen, and a recirculation carbon dioxide ($CO_2$) stream;
   at least one turbine, wherein the at least one turbine is operatively coupled to a direct air capture (DAC) carbon sequestration system and to a high pressure recirculation pump to optionally or simultaneously provide power produced by the at least one turbine to the DAC carbon sequestration system in a first operating mode or to a power grid separate from the integrated carbon sequestration and power generation system in a second operating mode;
   wherein the integrated carbon sequestration and power generation system is configured to switch between the first operating mode and the second operating mode based at least in part on whether a predetermined condition is determined to be satisfied; and;
   wherein the determining whether the predetermined condition is satisfied comprises determining whether a threshold number or type of power sources associated with the power grid are available.

11. The integrated carbon sequestration and power generation system of claim 10, wherein the biomass is a torrefied biomass.

12. The integrated carbon sequestration and power generation system of claim 10, further comprising:
   a scrubber, fluidly coupled to the gasifier, configured to clean the syngas.

13. The integrated carbon sequestration and power generation system of claim 12, further comprising:
   a low temperature heat exchanger, fluidly coupled to the scrubber, configured to cool the cleaned syngas.

14. The integrated carbon sequestration and power generation system of claim 10, wherein the power generation system includes at least one of a Brayton cycle, a recuperated Brayton cycle, or a Rankine cycle.

15. An integrated carbon sequestration and power generation system, comprising:
   a thermodynamic cycle configured to receive biomass and to generate heat and power; and
   a direct air capture (DAC) carbon sequestration system configured to receive at least some of the heat and at least some of the power generated by the thermodynamic cycle to facilitate carbon sequestration;
   wherein the integrated carbon sequestration and power generation system is configured to provide at least some of the power produced by the thermodynamic cycle to a power grid that is separate from the integrated carbon sequestration and power generation system;
   wherein the integrated carbon sequestration and power generation system is configured to switch between a first operating mode, in which at least some of the power produced by the thermodynamic cycle is used to power the DAC carbon sequestration system, and a second operating mode, in which at least some of the power produced by the thermodynamic cycle is provided to the power grid;
   wherein the integrated carbon sequestration and power generation system is configured to switch between the first operating mode and the second operating mode based at least in part on whether a predetermined condition is determined to be satisfied; and
   wherein the determining whether the predetermined condition is satisfied comprises assessing a weather forecast.

16. The integrated carbon sequestration and power generation system of claim 15, wherein the determining comprises determining that the predetermined condition is satisfied responsive to:
   identifying, from data associated with the weather forecast, that an upcoming weather event will affect an ability of a renewable energy provider to provide power provided to the power grid for a predetermined period of time.

17. The integrated carbon sequestration and power generation system of claim 16, wherein the integrated carbon sequestration and power generation system is configured to switch to and remain in the second operating mode during at least a portion of the predetermined period of time.

18. An integrated carbon sequestration and power generation system, comprising:
   a thermodynamic cycle configured to receive biomass and to generate heat and power; and
   a direct air capture (DAC) carbon sequestration system configured to receive at least some of the heat and at least some of the power generated by the thermodynamic cycle to facilitate carbon sequestration;
   wherein the integrated carbon sequestration and power generation system is configured to provide at least some of the power produced by the thermodynamic cycle to a power grid that is separate from the integrated carbon sequestration and power generation system;
   wherein the integrated carbon sequestration and power generation system is configured to switch between a first operating mode, in which at least some of the power produced by the thermodynamic cycle is used to power the DAC carbon sequestration system, and a second operating mode, in which at least some of the power produced by the thermodynamic cycle is provided to the power grid;
   wherein the integrated carbon sequestration and power generation system is configured to switch between the first operating mode and the second operating mode based at least in part on whether a predetermined condition is determined to be satisfied; and
   wherein the determining whether the predetermined condition is satisfied comprises determining whether a power grid operator has access to renewable energy from a renewable energy provider.

19. The integrated carbon sequestration and power generation system of claim 1, wherein the determining comprises determining that the predetermined condition is satisfied responsive to:
   identifying that the threshold number or type of power sources associated with the power grid are not available; and
   determining, responsive to identifying, that the power grid will become destabilized within a predetermined timed threshold.

20. The integrated carbon sequestration and power generation system of claim 19, wherein the integrated carbon sequestration and power generation system is configured to switch to the second operating mode prior to the predetermined time threshold.

\* \* \* \* \*